US009971820B2

(12) United States Patent
Bendel et al.

(10) Patent No.: US 9,971,820 B2
(45) Date of Patent: May 15, 2018

(54) DISTRIBUTED SYSTEM WITH ACCELERATOR-CREATED CONTAINERS

(71) Applicant: International Business Machines Corporation, Armonk, NY (US)

(72) Inventors: Peter Bendel, Holzgerlingen (DE); Oliver Benke, Stuttgart (DE); Oliver Draese, San Jose, CA (US); Roland Seiffert, Herrenberg (DE); Knut Stolze, Jena (DE)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 15/001,279

(22) Filed: Jan. 20, 2016

(65) Prior Publication Data
US 2016/0210316 A1    Jul. 21, 2016

(30) Foreign Application Priority Data
Jan. 20, 2015    (GB) .................................. 1500937.6

(51) Int. Cl.
*G06F 17/30*    (2006.01)

(52) U.S. Cl.
CPC .... *G06F 17/30566* (2013.01); *G06F 17/3051* (2013.01); *G06F 17/30292* (2013.01); *G06F 17/30309* (2013.01); *G06F 17/30415* (2013.01)

(58) Field of Classification Search
CPC ......... G06F 17/30566; G06F 17/30292; G06F 17/30309; G06F 17/30415; G06F 17/3051
USPC ....................................................... 707/803
See application file for complete search history.

(56) References Cited

U.S. PATENT DOCUMENTS

| | | | | |
|---|---|---|---|---|
| 5,970,490 A * | 10/1999 | Morgenstern | ..... | G06F 17/30569 |
| 6,003,025 A * | 12/1999 | Prager | ............... | G06F 17/30557 |
| 6,078,924 A * | 6/2000 | Ainsbury | .......... | G06F 17/30011 |
| 6,236,994 B1 * | 5/2001 | Swartz | ............. | G06F 17/30557 |
| | | | | 707/635 |
| 6,240,416 B1 * | 5/2001 | Immon | ............. | G06F 17/30575 |
| 6,611,838 B1 * | 8/2003 | Ignat | ................. | G06F 17/30563 |
| 7,150,015 B2 * | 12/2006 | Pace | ........................ | G06F 8/60 |
| | | | | 717/176 |
| 7,752,230 B2 | 7/2010 | Bland et al. | | |
| 7,853,554 B2 * | 12/2010 | Wan | .................. | G06F 17/30557 |
| | | | | 707/602 |
| 9,177,172 B2 * | 11/2015 | Robinson | ............ | G06F 21/6227 |
| 9,460,173 B2 * | 10/2016 | Abrams | ............ | G06F 17/30566 |

(Continued)

OTHER PUBLICATIONS

Böhm, Matthias, et al., "Model-Driven Development of Complex and Data-Intensive Integration Processes", MBSDI 2008, Berlin, Germany, Apr. 1-3, 2008, pp. 31-42.*

(Continued)

*Primary Examiner* — Robert Stevens
(74) *Attorney, Agent, or Firm* — David B. Woycechowsky

(57) ABSTRACT

A distributed database system (or federated database system) comprises a constituent database management system (DMBS), an accelerator system and a single interface. The accelerator system creates a data container in accordance with structural features identified by the accelerator system and stores data in the data container. The constituent database system supplements incomplete metadata associated with the data container to create complete metadata descriptive of the namespace and structure of the data container created by the accelerator system.

20 Claims, 4 Drawing Sheets

(56) References Cited

U.S. PATENT DOCUMENTS

| | | | |
|---|---|---|---|
| 2006/0265385 A1* | 11/2006 | Agrawal | G06F 17/30566 |
| 2010/0023496 A1 | 1/2010 | Mohan | |
| 2012/0259824 A1 | 10/2012 | Zagelow et al. | |
| 2012/0323884 A1 | 12/2012 | Draese et al. | |
| 2013/0332694 A1* | 12/2013 | Reissner | G06F 3/0644 |
| | | | 711/172 |
| 2014/0095441 A1 | 4/2014 | Draese et al. | |
| 2014/0095530 A1* | 4/2014 | Lee | G06F 11/1471 |
| | | | 707/769 |
| 2015/0200967 A1* | 7/2015 | Redlich | G06Q 10/10 |
| | | | 726/1 |

OTHER PUBLICATIONS

Simitsis, Alkis, "Modeling and Optimization of Extraction-Transformation-Loading (ETL) Processes in Data Warehouse Environments", National Technical University of Athens, School of Electrical and Computer Engineering, Division of Computer Science, Athens, Greece, Oct. 2004, 202 pages.*

Bendel et al., "Distributed System With Accelerator and Catalog", Application No. 1500934.3 filed Jan. 20, 2015, 48 pages.

Bendel et al., "Distributed System With Accelerator-Created Containers", Application No. 1500937.6 filed Jan. 20, 2015, 61 pages.

IBM, "DB2 Analytics Accelerator for z/OS", provided by inventor in Main Idea of Disclosure dated May 6, 2014, <http://www-03.ibm.com/software/products/de/db2analacceforzos>, 2 pages.

IBM, "Creating a clone table", DB2 11—Administration, provided by inventor in Main Idea of Disclosure dated May 6, 2014, <http://www-01.ibm.com/support/knowledgecenter/api/content/nl/en-us/SSEPEK_11.0.0/com.ibm.db2z11.doc.admin/src/tpc/db2z_createclonetable.dita>, 2 pages.

IBM, "Publications for the IBM Informix family of products", provided by inventor in Main Idea of Disclosure dated May 6, 2014, <http://www-01.ibm.com/support/docview.wss?uid=swg27010058#wq710>, 11 pages.

IBM, "Using a Select . . . Into Statement", provided by inventor in Main Idea of Disclosure dated May 6, 2014, <http://www-01.ibm.com/support/knowledgecenter/api/content/nl/en-us/SSGU8G_11.70.0/com.ibm.sqls.doc/ids_sqs_1332.htm>, 1 page.

IBM, "What is transparent DDL", IBM InfoSphere Federation Server, Version 10.5, provided in IP&L Disclosure Evaluation dated Aug. 15, 2014, <https://www-304.ibm.com/support/knowledgecenter/api/content/nl/en-us/SSEPGG_10.5.0/com.ibm.swg.im.iis.fed.sysadmin.doc/topics/cfpddl01.html>, 2 pages.

"Temporary Table Support for DB2 under z/OS", SAS/Access(R) 9.3 for Relational Databases: Reference, Second Edition, provided by inventor in Main Idea of Disclosure dated May 6, 2014, <http://support.sas.com/documentation/cdl/en/acreldb/65247/HTML/default/viewer.htm#n013f2u10f81san1fegz77ahf8gk.htm>, 4 pages.

Appendix P—List of IBM Patents or Patent Applications Treated as Related, Filed Jan. 28, 2016, 2 pages.

* cited by examiner

DISTRIBUTED SYSTEM WITH ACCELERATOR-CREATED CONTAINERS

BACKGROUND

The present invention relates to data processing in distributed systems and more specifically, to processing data in a distributed database system (also called a federated database or federated database system) which manages data stored in database(s) and at least one complete or partial copy of the data.

Heterogeneous, distributed data is commonly stored and analyzed in federated database systems. A federated database system is a type of distributed data processing system, also referred to as "meta-database management system," which transparently maps multiple autonomous database systems into a single "federated database." The constituent databases of the federated database are interconnected via a computer network and may be geographically decentralized. Because the constituent database systems remain autonomous, a federated database system is an alternative to the task of merging several disparate databases. A federated database is a composite of all constituent databases in a federated database system, whereby each constituent database system maintains its respective interface for receiving database queries. Each constituent database system stores and autonomously maintains a catalog descriptive of the tables of the respective constituent database. Typically, there is no unified, central schema that encompasses all of the information available from the members (that is, constituent databases) of the federation (that is, the federated database considered as a whole).

In case it should be necessary to integrate and synchronize at least parts of the data stored in different constituent database management systems of a federated database system, additional protocols are typically implemented for synchronizing the data, for example for example "two-phase commit protocols (2PC)" or "three-phase commit protocols (3PC)."

SUMMARY

According to an aspect of the present invention, there is a method, computer program product and/or system for use in connection with a federated database system including a database management system (DBMS) structured and programmed to manage access to database data stored in a constituent database, a catalogue, an accelerator system including a copy of a first portion of the database data and a single interface. The method, computer program product and/or computer system performs the following operations (not necessarily in the following order): (i) maintaining, by the first DMBS, first metadata information in the catalogue, with the first metadata information being descriptive of a structure of a first data container type used to store at least some of the database data in the constituent database; (ii) detecting, by the DBMS, a trigger event for calculating a computational task; (iii) in response to the detection, creating, by the DBMS, an incomplete version of second metadata information, with the second metadata information being descriptive of a structure of a second data container type, with data containers of the second data container type being absent from the accelerator system, and with the incomplete version of the second metadata including a name or a namespace for the second data container type, and with the incomplete version of the second metadata information lacking at least some structural information descriptive of the second data container type; (iv) receiving, by the DBMS and from the accelerator system, dynamically-identified information indicative of structural features the second data container type absent from the incomplete version of the second metadata information; and (v) responsive to receipt of the dynamically-identified information, supplementing, by the DBMS, the incomplete version of the second metadata information with the dynamically-identified information to create a complete version of the second metadata information descriptive of a name and a data structure of the second data container type.

According to a further aspect of the present invention, there is a method, computer program product and/or system for use in connection with a federated database system including a database management system (DBMS) structured and programmed to manage access to database data stored in a constituent database, a catalogue including first metadata information, with the first metadata information being descriptive of a structure of a first data container type used to store at least some of the database data in the constituent database, an accelerator system including a copy of a first portion of the database data, and a single interface. The method, computer program product and/or computer system performs the following operations (not necessarily in the following order): (i) receiving, from the DBMS, an incomplete version of second metadata information, with the second metadata information being descriptive of a structure of a second data container type, with data containers of the second data container type being absent from the accelerator system, and with the incomplete version of the second metadata including a name or a namespace for the second data container type, and with the incomplete version of the second metadata information lacking at least some structural information descriptive of the second data container type; (ii) dynamically identifying, by the accelerator system, dynamically-identified information including information indicative of structural features absent from the incomplete version of the second metadata information; (iii) transmitting, by the accelerator system and to the DBMS, the dynamically-identified information; (iv) creating, by the accelerator system, a first instance of a second data container according to the second data container type as specified by the second metadata information; (v) storing, in the accelerator system, the first instance second data container; and (vi) filling with data the first instance of the second data container.

According to a further aspect of the present invention, a federated database system includes: (i) a database management system (DBMS) structured and programmed to manage access to database data stored in a constituent database; (ii) a catalogue; and (iii) an accelerator system including a copy of a first portion of the database data and a single interface. The first DMBS includes machine logic structured and programmed to perform the following operations (not necessarily in the following order: (i) maintain first metadata information in the catalogue, with the first metadata information being descriptive of a structure of a first data container type used to store at least some of the database data in the constituent database; (ii) detect a trigger event for calculating a computational task; (iii) in response to the detection, create an incomplete version of second metadata information, with the second metadata information being descriptive of a structure of a second data container type, with data containers of the second data container type being absent from the accelerator system, and with the incomplete version of the second metadata including a name or a namespace for the second data container type, and with the incomplete version of the second metadata information lacking at least some structural information descriptive of the second data container type, (iv) receive from the accelerator system, dynamically-identified information indicative of structural features the second data container type absent from the incomplete version of the second metadata information, and (v) responsive to receipt of the dynamically-identified information, supplement the incomplete version of the second metadata information with the dynamically-identified information to create a complete version of the second metadata information descriptive of a name and a data structure of the second data container type. The accelerator system is structured and programmed to perform the following operations (not necessarily in the following order): (i) receive, from the DBMS, an incomplete version of second metadata information, with the second metadata information being descriptive of a structure of a second data container type, with data containers of the second data container type being absent from the accelerator system, and with the incomplete version of the second metadata including a name or a namespace for the second data container type, and with the incomplete version of the second metadata information lacking at least some structural information descriptive of the second data container type; (ii) dynamically identify dynamically-identified information including information indicative of structural features absent from the incomplete version of the second metadata information; (iii) transmit, to the DBMS, the dynamically-identified information; (iv) create a first instance of a second data container according to the second data container type as specified by the second metadata information; (v) store, in the accelerator system, the first instance second data container, and (vi) fill with data the first instance of the second data container.

BRIEF DESCRIPTION OF THE DRAWINGS

In the following embodiments of the invention are explained in greater detail, by way of example only, making reference to the drawings in which.

DETAILED DESCRIPTION

Figure 1:
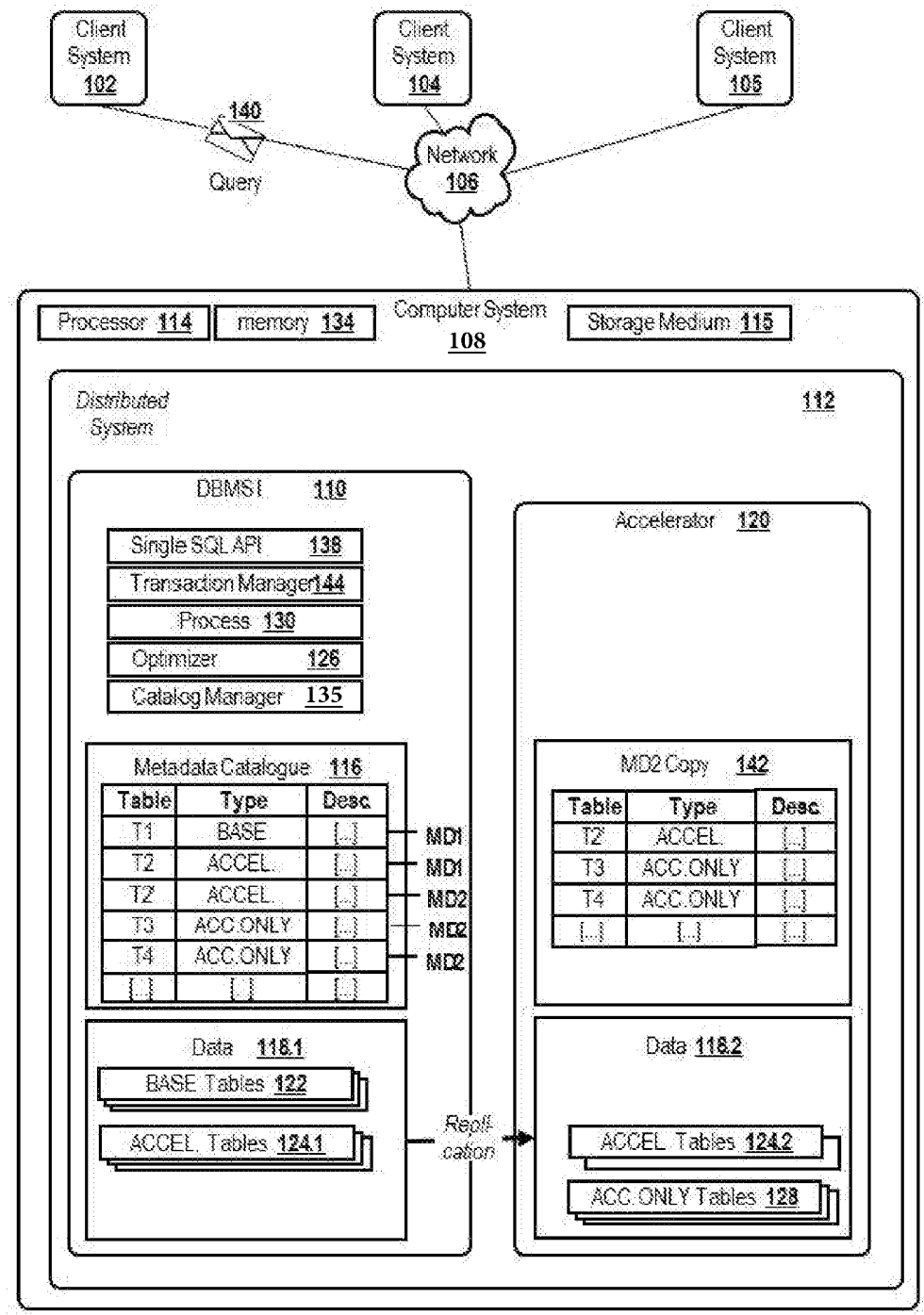
FIG. 1 depicts a block diagram of a distributed system connected to multiple clients according to an embodiment of the present invention.

Some embodiments of the present invention may recognize one, or more, of the following potential problems, drawbacks and/or areas for potential improvement with respect to conventional technology: (i) in federated database management systems, there is no actual data integration in the constituent disparate databases as a result of data federation; (ii) implementation of additional protocols (as mentioned above) are computationally expensive; and (iii) additional protocols may result in blocking of large parts of the data during synchronization.

Embodiments of the present invention, discussed herein, can be freely combined with each other if they are not mutually exclusive.

Some embodiments of the present invention are directed to a computer-implemented method for processing data in a distributed system as described in this paragraph. The distributed system includes a first database management system, an accelerator system and a single interface. The first database management system includes database data (sometimes more simply referred to as "data"). The accelerator system includes a copy of at least some parts of the data. The first database management system being configured for maintaining a catalogue, the catalogue includes first and second metadata. The first metadata is descriptive of the structure of first data containers stored in the first database management system. The second metadata is descriptive of the structure of second data containers stored in the accelerator system. The accelerator system is configured to process only database queries that are received by the distributed system via the single interface. The single interface is configured to receive a database query and to access the catalogue.

Some embodiments of the present invention are directed to a method including the following operations (not necessarily in the following order): (i) detecting, by the first database management system, a trigger event for calculating a computational task; (ii) in response to the detection, creating, by the first database management system, incomplete second metadata for a second data container which is absent from the accelerator system, the incomplete second metadata comprising a name or a namespace for the absent second data container and lacking structural information of the second data container; (iii) causing, by the first database management system, the accelerator system to execute program logic of the accelerator system as set forth later in this paragraph; and (iv) in response to the transmission of the dynamically identified information, supplementing, by the first database management system, the incomplete second metadata with the transmitted information, thereby creating complete second metadata, the complete second metadata being descriptive of the name and structure of the created second data container, the complete second metadata enabling the single interface to dispatch any database statement addressing the created second data container to the accelerator system for performing the dispatched database statement on the data filled into the second data container. The execution of the program logic of the accelerator of operation (iii) includes: (a) dynamically identifying information being indicative of structural features the absent second data container shall comply to; (b) transmitting the dynamically identified information to the first database management system; (c) creating the second data container for which the incomplete second metadata was already created in accordance with the structural features; (d) storing the created second data container in the accelerator system; and (e) filling the created second data container with data.

Some embodiments of the present invention perform a computational task in an accelerated manner. In some embodiments, the creation of at least some second data containers is delegated to the accelerator system. This may be beneficial in particular for the delegation of complex, multi-step computational tasks. Such computational tasks may require the existence of second data containers whose structure is determined and specified dynamically and which therefore cannot be created in advance. The proposed solution may avoid computational overhead of federated systems as only a single interface is provided which is capable of accessing a central metadata catalogue comprising the metadata of the data containers of both sub-systems. No 2PC or 3PC protocols are needed. In addition, the proposed solution may avoid computational overhead by allowing and enabling the accelerator system to dynamically create second data containers in the accelerator system. This may be particularly advantageous for second data containers whose structure is not known in advance, because the number or structure of the data containers may be calculated dynamically when performing an analytical computational task. If the first database management system would be responsible for defining the structure of the second data containers and for creating the second data containers in the accelerator system, it would be necessary to execute the task by the first database management system (which may not be speed-optimized for the task) or to transfer results or intermediate results from the accelerator to the first database management system in order to enable the first database management system to determine the structure of the second data containers necessary for storing some intermediate or final results. Instead of communicating the intermediate results and results of a complex calculation from the accelerator to the first database management system, the accelerator system is enabled to create the second data containers.

Conflicts which may arise from concurrent execution of a particular computational task on different sets of input data which try to create second data containers with identical names may be avoided by creating the incomplete metadata. The incomplete metadata comprises the name or a namespace for a second data container which is to be created at a later moment in time by the accelerator system. Thus, the incomplete metadata may ensure that the parallel execution of multiple instances of a computational task will not result in the generation of multiple containers having identical names and will not result in a loss of data due to an error when trying to create a data container with a name that already exists.

For example, when performing unsupervised clustering or related analytical tasks, it may be beneficial to delegate such tasks to the accelerator system which may be capable of performing analytical computational tasks more efficiently than the first dataset management system. If the first database management system and the accelerator system would maintain the metadata of their respective data containers independently, computationally demanding protocols would be required in order to keep transactional data changes in both sub-systems in sync. This situation may be avoided by providing the single interface that is capable of accessing the metadata catalog comprising the metadata of both sub-systems, and by using a central catalog comprising first and second metadata, the catalog being updated and incomplete second metadata being supplemented with structural information in case the accelerator system dynamically creates a new second data container.

According to some embodiments, the information being indicative of structural features according to which the second data container is created and/or the information transferred to the first database management system is indicative of structural features of the second data container. The information may comprise for example the number of the columns of the second data container. In addition, or alternatively, the information comprises column names of the columns of the second data container and/or the data types of the columns of the second data container. In addition, or alternatively, the information comprises a database constraint for one or more of the columns of the second data container and/or a database constraint for the whole second data container.

A data container may be, for example, a database table or a database view.

In some embodiments, the accelerator system is allowed to determine which attributes of the data being analyzed when performing the computational task are represented as columns of tables or views which shall be used as the second data containers, for example, by identifying principal components in data that is analyzed. In general, second data containers may contain any computation based on input data, with column names being derived from some analyzed data values. In some embodiments, each step of the computational task may be under the control of the first database management system and all analytical processing steps. For example complex data mining tasks and algorithms, may be performed on the accelerator system. In some embodiments, the first database management system may have access to all data generated on the accelerator system via the second metadata. However, unless the data is really needed, only the structural metadata information required to complete the incomplete metadata is transferred to the first database management system. In some embodiments, no intermediate result may be communicated to the first database management system unless needed and explicitly requested by the first database management system from the accelerator system. This may reduce network traffic and increase performance.

According to some embodiments, the program logic contained in the accelerator system comprises or is implemented in the form of one or more stored procedures. The one or more stored procedures are configured for calculating a result for the computational task. This may be beneficial as complex analytical calculations may be specified in the accelerator system whose execution can be triggered easily by a single call to the stored procedure.

In some embodiments, the one or more stored procedures respectively are assigned to one out of a plurality of computational tasks. The trigger event is assigned to one out of the plurality of computational tasks. In response to the detection, the first database management system identifies the one of a plurality of computational tasks which is assigned to the detected trigger event and identifies at least one of the one or more stored procedures which is assigned to the one identified computational task. This may be advantageous, because in dependence on the trigger event, for example a request for performing a particular data analysis, a particular statistical evaluation or a particular clustering algorithm, a respective stored procedure in the accelerator system may be called, and second data containers may be created dynamically whose structure is specifically adapted to store intermediate results generated when performing the particular analysis, statistical evaluation or clustering algorithm. Also, the name and namespace that is created and reserved in the catalog by the first database management system may be specific for the particular computational task assigned to the trigger event. For example, two second data containers to be created for the kmeans clustering algorithm may have the name "kmeans_clusternodes" and "kmeans_clusteredges".

In some embodiments, the data filling the second data container is the result of performing the computational task. In some embodiments, the computational task is performed in multiple steps.

In some embodiments, the performance of each step of a multi-step computational task includes the following operations (not necessarily in the following order): (i) triggering, by the accelerator system or by the trigger event, the first database management system to create further incomplete second metadata for a further second data container, the further second data container being absent from the accelerator system at the moment of creating the further incomplete second metadata, the incomplete second metadata comprising a name or a namespace for the further second data container and lacking structural information of the further second data container; (ii) dynamically identifying, by the accelerator system, further information, the further information being indicative of structural features of the further second data container; (iii) transmitting the dynamically identified further information to the first database management system; (iv) creating, by the accelerator system, the further second data container for which the further incomplete second metadata was already created in accordance with the structural features; (v) storing the created further second data container in the accelerator system; (vi) filling the created further second data container with an intermediate result calculated in the step of the computational task; (vii) in response to the transmission of the dynamically identified further information, supplementing, by the first database management system, the incomplete further second metadata with the transmitted further information, thereby creating further complete second metadata, the further complete second metadata being descriptive of the name and structure of the created further second data container.

According to some embodiments, the single interface dispatches each database statement addressing any one of the further second data containers for which the further complete second metadata was created to the accelerator system. The accelerator system performs each dispatched database statement on the intermediate result having been filled into the further second data container addressed by the dispatched database statement. This may be beneficial, because the dispatching may reduce the computational load of the first database management system. The first database management system and the accelerator system may respectively be speed-optimized for different kinds of database statements. The dispatching of database statements to the accelerator system may allow to selectively dispatch database statements to the accelerator system which are processed by the accelerator system quicker than by the first database management system.

Some embodiments of the present invention are directed to a computer program product for processing data in a distributed system. In some embodiments, the computer program product includes a computer readable storage medium having program instructions embodied therewith. The program instructions are executable by a processor to cause the processor to execute the computer-implemented method according to any one of the embodiments described herein.

Some embodiments of the present invention are directed to a distributed computer system. The distributed computer system comprises a first database management system, an accelerator system and a single interface. The first database management system comprises data and a catalogue. The catalogue comprises first and second metadata. The first metadata is descriptive of the structure of first data containers stored in the first database management system. The second metadata is descriptive of the structure of second data containers stored in an accelerator system. The accelerator system comprising a copy of at least some parts of the data. The single interface is configured for receiving a database query and is configured for accessing the catalogue. In some embodiments, the accelerator system only processes database queries received by the distributed system via the single interface.

In some embodiments, the first database management system is configured for: (i) detecting a trigger event for calculating a computational task; (ii) in response to the detection, creating incomplete second metadata for a second data container which is absent from the accelerator system at the moment of the detection, the incomplete second metadata comprising a name or a namespace for the absent second data container and lacking structural information of the second data container; and (iii) causing, by the first database management system, the accelerator system to execute program logic of the accelerator system.

In some embodiments, the accelerator system is configured for performing, upon executing the program logic, the following operations (not necessarily in the following order): (i) dynamically identifying, by the accelerator system, further information, the further information being indicative of structural features of the further second data container; (ii) transmitting the dynamically identified further information to the first database management system; (iii) creating, by the accelerator system, the further second data container for which the further incomplete second metadata was already created in accordance with the structural features; (iv) storing the created further second data container in the accelerator system; and (v) filling the created further second data container with an intermediate result calculated in the step of the computational task.

In some embodiments, the first database management system is configured for supplementing, in response to the transmission of the dynamically identified information, the incomplete second metadata with the transmitted information, thereby creating complete second metadata. The complete second metadata is descriptive of the name and structure of the created second data container. The complete second metadata enables the single interface to dispatch any database statement addressing the created second data container to the accelerator system for performing the dispatched database statement on the data filled into the second data container.

Figure 4:
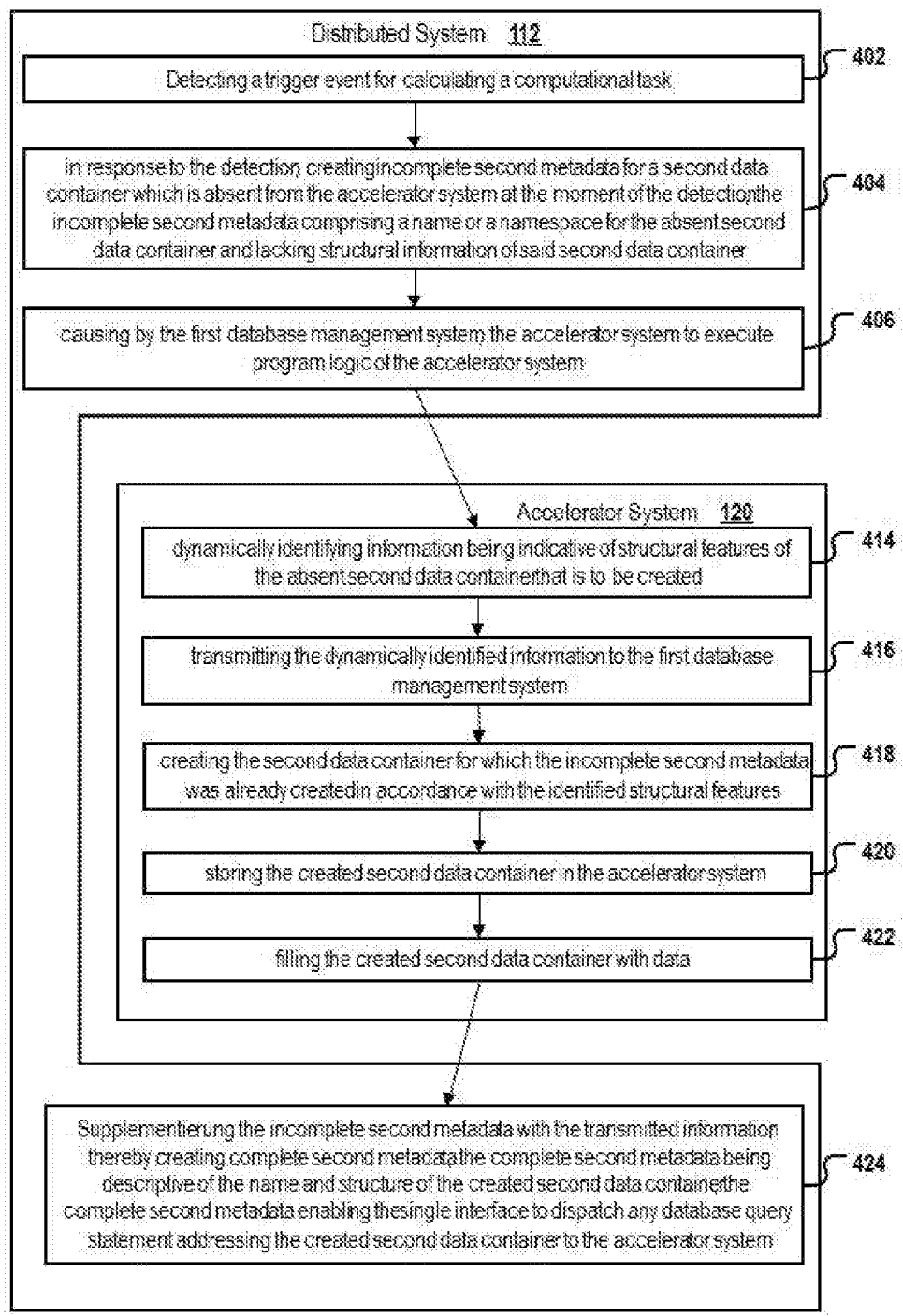
FIG. 4 depicts a flow chart of a method according to another embodiment of the invention.

FIG. 1 shows a block diagram of a distributed system comprising a first database management system (DBMS) and an accelerator system According to some embodiments of the invention. In the following, the distributed system and the interaction between the first DBMS and the accelerator system will be described by making reference to the flow chart of a computer implemented method of processing data 118 (see FIG. 1) in the distributed system 112 as depicted in FIG. 4.

Computer system 108 comprises a first database management system (also sometimes referred to as "DBMSI" or "first "DBMS") 110, an accelerator system 120, a single interface (also sometimes referred to as "single SQU API") 138, processor 114, memory 134 and storage medium 115. The first database management system comprises data 118.1, for example some user data or application data that shall be processed and analyzed. The accelerator system comprises a copy 118.2 of at least some parts of the data 118.1. For example, the first DBMS may comprise some database tables and the accelerator system may also store the information of the database tables, whereby the information may be stored in tables which structurally deviate from the tables of the first DBMS. The first DBMS is configured for maintaining a catalogue 116. The catalogue comprises first metadata MD1 and second metadata MD2. The first metadata is descriptive of the structure of first data containers 122, 124.1 stored in the first database management system. The second metadata is descriptive of the structure of second data containers 124.2, 128 stored in the accelerator system. In some embodiments, the accelerator system is configured so that it only processes database queries received by the distributed system 112 via the single interface. In some embodiments, the first DBMS also is configured only to process database queries received via the single interface. For example, the database interface of the first DBMS may act as the single interface of the distributed system. The single interface is configured for receiving a database query (also sometimes herein referred to as "trigger event") 140 and for accessing the catalogue.

The method of FIG. 4 includes the operations respectively set forth in the following paragraphs (not necessarily in order).

OPERATION (1) (performed by distributed system 112): detecting 402, by the first DBMS, a trigger event for calculating a computational task. The trigger event may be, for example, the receipt of a database query or another query for performing a computational task. For example, the query may be received via the single interface 138 from one of the client systems (also sometimes herein referred to as "client computers" or, simply, "clients") 102, 104, 105 via a network 106, for example the internet. The trigger event may likewise be a user command or a cron job running on the computer system 108 hosting the first DBMS.

OPERATION (2) (performed by distributed system 112): in response to the detection, creating 404, by the first DBMS, incomplete second metadata for a second data container which is absent from the accelerator system at the moment of the detection. The incomplete second metadata comprises a name or a namespace for the absent second data container and lacks structural information of the second data container.

OPERATION (3) (performed by distributed system 112): causing 406, by the first DBMS, the accelerator system to execute program logic of the accelerator system. The first DBMS may delay the causing until the incomplete second metadata was created successfully to ensure that the name or the namespace is reserved for the second data container that will be created when executing the program logic.

OPERATION (4) (performed by accelerator system 112): dynamically identifying 414 information being indicative of structural features the absent second data container shall comply to. For example, data stored for example in one or more second data containers may dynamically be analyzed by the accelerator system for identifying the number and names of columns a second data container should comprise in order to be capable to store the results of the analysis and/or for identifying constraints which should be imposed on the second data container. The analysis may be a single step in a multi-step computational task and the result may be an intermediate result.

OPERATION (5) (performed by accelerator system 120): transmitting 416 the dynamically identified information to the first database management system.

OPERATION (6): creating 418 the second data container for which the incomplete second metadata was already created in accordance with the dynamically identified structural features. For example, the first DBMS may send the name or the namespace being comprised in the incomplete metadata to the accelerator system for enabling the accelerator system to create the second data container with the name or namespace.

OPERATION (7) (performed by accelerator system 120): storing 420 the created second data container in the accelerator system.

OPERATION (8) (performed by accelerator system 120): filling 422 the created second data container with data; for example, the accelerator system may have executed some analytical or statistical evaluation of data when performing the computational task and may store the data into the second data container. For example, the created second data container may be filled with a result calculated by the accelerator system for the computational task.

OPERATION (9) (performed by distributed system 112): in response to the transmission of the dynamically identified information, the first DBMS supplements 424 the incomplete second metadata with the transmitted information, thereby creating complete second metadata. The complete second metadata is descriptive of the name and structure of the created second data container. The complete second metadata enables the single interface to dispatch any database statement addressing the created second data container to the accelerator system for performing the dispatched database statement on the data filled into the second data container.

Depending on the embodiment, the dynamically identified information may be transmitted to the first DBMS before, during or after the second data container is created. In any case, the second data container is not accessible from outside the accelerator system until the incomplete second metadata of the second data container was supplemented successfully with the transmitted information being indicative of the structural features of the second data container.

Some embodiments of the present invention may provide a highly efficient and flexible distributed system may be provided which does not have to communicate intermediate results calculated by the accelerator to the first DBMS in order to allow the first DMBS to keep control of the ongoing calculations. Rather, the transferring of structural information is sufficient to enable the first DBMs to control the performing of the stored procedure in the accelerator system and to retrieve data by the first DBMS when needed by means of explicit requests. For example, the first DBMS may be able to access second data containers having been created by the accelerator system for storing an intermediate result and result data in order to selectively retrieve the final result or individual intermediate results which are of interest.

According to some embodiments, the single interface is configured for evaluating any database query received from a client 102, 104, 105.

If the evaluation returns that the received database query comprises a data definition language (DDL) statement related to the creation or modification of a first data container in the first database management system, the single interface provides the data definition language statement to the first database management system. For example, the single interface can dispatch the DDL statement to the first DBMS via a network. It is possible that the single interface is the SQL interface of the first DBMS. In this case the single interface may merely forward the DDL statement to another module of the first DBMS, for example the processing module (also sometimes referred to as "process") 130. Then, the first DBMS processes the provided DDL. The processing comprising creating or modifying, by the first DBMS, the first data container according to the data definition language statement.

If the evaluation returns that the received database query comprises a DDL statement related to the creation or modification of a second data container in the accelerator system, the single interface provides the data definition language statement to the first DBMS. The first DBMS processes the DDL statement. The processing comprises creating a trigger signal. The "trigger signal" may be data that is communicated from the first DBMS to the accelerator system for causing the accelerator system to perform an action. For example, a trigger signal may be communicated to the accelerator system in order to trigger the accelerator system to create, delete or update a second data container according to information specified in a DDL statement which caused the generation of the trigger signal. The trigger signal may be implemented, for example, as a remote procedure call of the first DBMS to the accelerator system. Alternatively, the trigger signal may be an unmodified or modified copy of the DDL statement that is forwarded from the first DBMS to the accelerator system. The modification may relate to adapting the DDL statement to the syntax of the accelerator system. For example, the modified DDL statement can be transferred from the first DBMS to the accelerator system using DRDA (Distributed Relational Database Architecture) protocol.

If the evaluation returns that the received database query comprises a data manipulation language (DML) statement, the single interface determines if the DML statement shall be processed by the first database management system or shall be dispatched to the accelerator system for being processed. For example, this can be achieved by evaluating container type labels assigned to the first and second metadata of the first and second data containers. In response to the generation of the trigger signal, the accelerator system creates, deletes or updates the second data container to which the data definition language statement relates in the accelerator system. In addition, the accelerator system triggers the updating of the second metadata in the catalogue 116 such that the updated second metadata is descriptive of the created, deleted or updated second data container.

If the DML statement is dispatched to the accelerator system, the accelerator system processes the dispatched DML statement on data 118.2 contained in the second data containers. This may be beneficial as the central catalogue comprising first and second metadata and the single interface capable of accessing the metadata and of redirecting DDL statements selectively to the first DBMS may ensure that all data containers of both sub-systems 110, 120 of the distributed system are handled consistently. Also a consistent central transaction management may be facilitated.

According to some embodiments, the first DBMS checks, before creating the incomplete metadata, if another incomplete or complete metadata comprising the name or the namespace has already been created by the DBMS in response to a previous trigger event or for another computational task that is executed in parallel. If the checking returns that the other metadata already exists in the catalogue 116, the first DBMS abstains from causing the accelerator system to execute the program logic. Alternatively, the first DBMS may create incomplete metadata for the second data container which comprises a modified name or a modified namespace. The modified name or a modified namespace may be communicated to the accelerator system to enable the accelerator system to use the modified name or namespace for creating the second data containers.

Thus, a name for a second data container is created and reserved by the first DBMS but the task of defining the structure of the second data container is delegated to the accelerator side. As a result, the structure of the second data container can be adapted dynamically to the analytical processing results, for example dynamically determined clusters, without having to transfer the analysis (intermediate) results to the first DBMS. Only the structural information needs to be communicated from the accelerator to the first DBMS. This may significantly reduce network traffic. This is particularly advantageous in a distributed networked system wherein the first DBMS and the accelerator system are connected to each other via a network.

According to some embodiments, the first interface is configured for making the first and second metadata of any one of the first and second data containers available to a client 102, 104, 105.

This may be beneficial as for client applications like SPSS it looks as if the called stored procedure has been executed by the first DBMS although the first DBMS delegated the execution of the requested computational task to the accelerator and although only the accelerator system created all intermediate results and the respective second data containers. Nevertheless, a client of the first DBMS is enabled to access the generated information by using the complete second metadata if needed.

According to some embodiments, the first DBMS 110 is speed-optimized for different kinds of database queries other than the accelerator system 120. For example, the first DBMS may be optimized for online transaction processing (OLTP) and the accelerator system may be optimized for performing online analytic processing (OLAP). This may be beneficial as complex analytical computational tasks may be delegated to the accelerator system which may calculate a result for an analytical task quicker than the first DBMS.

According to some embodiments, the catalogue comprises, for each of the first and second data containers, a first, second and/or third container type label. The first container type label, for example "BASE", indicates that the data container 122 and its data content are solely stored in the first DBMS. The second data container type label "ACCELERATOR ONLY" indicates that the data container 128 and its data content are solely stored in the accelerator system. The third container type label "ACCELERATED" indicates that the data container 124 (including 124.1, 124.2) and its data content are stored in the first database management system and are allowed to be stored as a copy in the accelerator system.

The first DBMS assigns the second data container type label ("ACCELERATOR ONLY") to the complete second metadata. This may be beneficial, because the container type labels enable the single interface to evaluate the catalogue in order to determine if a particular database statement of a received database query will access a first or a second data container and allows the single interface to determine if the database statement shall be dispatched for execution to the accelerated system or shall be provided to the first DBMS for execution.

For example, the catalogue may comprise metadata of a first data container having assigned the first container type label and may comprise metadata of a second data container having assigned the second container type label and may comprise metadata of a second data container having assigned the third container type label. When the first DBMS creates the incomplete metadata or when the first DBMS supplements the incomplete metadata with the structural information, the first DBMS in addition assigns the second container type label to the incomplete or complete metadata. Thus, the single interface is enabled to dynamically determine that any database statement which is to access one of the second data containers for which the complete metadata was created shall be dispatched for execution to the accelerator system as the first DBMS does not comprise the data stored in the second data containers.

According to some embodiments, the single interface receives a further database query and evaluates the received further database query for identifying one or more data manipulation statements and/or one or more data definition statement contained in the received further database query. The single interface may also evaluate the container type label of all first and second data containers that will be accessed by any one of the one or more identified data manipulation language statements.

The single interface dispatches each of the identified data manipulation language statements to the accelerator system obligatorily in case the data manipulation language statement will access at least one of the second data containers having assigned the second container type label ("ACCELERATOR ONLY") and will not access one of the first data containers having assigned the first container type label (BASE).

In addition, or alternatively, the single interface provides each of the identified data manipulation language statements to the first database management system obligatorily for execution in the first database management system in case the identified data manipulation language statement will access at least one of the first data containers having assigned the first container type label (BASE) and will not access one of the second data containers having assigned the second container type label ("ACCELERATOR ONLY").

In addition, or alternatively, the single interface dispatches each of the identified data manipulation language statements to the accelerator system only in case the identified data manipulation language statement will access only one or more second data containers respectively having assigned the third container type label (ACCELERATED) and in case the first database management system predicts that the data manipulation language statement will be executed quicker in the accelerator system than in the first database management system.

In addition, or alternatively, the single interface throws an error message in case the identified data manipulation language statement will access at least one of the first data containers having assigned the first container type label (BASE) and will in addition access one of the second data containers having assigned the second container type label ("ACCELERATOR ONLY"). This may reduce data traffic as it may be ensured that the statement is aborted in case it accesses both a container in the first as well as a container in the accelerator system. According to some embodiments, the SQL query syntax supported by the distributed system is restricted with the effect that some SQL statements accessing both a data container labeled with "BASE" and a data container labeled with "ACCELERATOR ONLY" (like a federated JOIN between the two data containers) are rejected with an error message. The SQL query syntax of the distributed system may support other queries like "INSERT FROM SELECT" statements which retrieve data from first data containers labeled as "BASE" containers as well as from second data containers labeled as "ACCELERATOR ONLY" containers. The first interface will provide such "INSERT FROM SELECT" statements to the first DBMS for processing. An example of such a statement would be a statement like "INSERT INTO DBMS1.table2 (column_name(s)) SELECT column_name(s) FROM ACCELERATOR.table1;).

For example, the single interface may evaluate the table names contained in a statement to identify one or more tables acting as first and/or second data containers to be accessed. Then, the first and/or second metadata assigned to the identified by a statement to identify the metadata assigned to the identified data containers. Then, the container type labels assigned to the identified first and/or second metadata are evaluated.

The features may enable a dynamic dispatching of DML database statements in dependence on the type of the data container accessed. This may increase performance, for example by enabling a database designer to create first and/or second data containers whose metadata are labeled with information that allows for an automated dispatching of DML queries such that performance of query execution can be increased and/or such that data traffic for synchronizing the data content of the first DBMS and the accelerator system can be avoided. The features may allow to selectively store some particular containers solely in the first DBMS (for example "BASE" tables) or solely in the accelerator system (for example "ACCELERATOR ONLY" tables) and to dynamically route a statement to the subsystem that comprises the relevant and requested data. This may allow avoiding to store each and every part of the data 118.1 as a copy in the accelerator system, thereby avoiding data traffic and reducing the consumption of storage space. It may also allow avoiding transferring data from the accelerator system to the first DBMS which might not be required there.

For example, containers whose metadata has assigned the first ("BASE") container type label may comprise only data which is never used during data analytical tasks to be performed on the accelerator system.

Likewise, containers having assigned the second ("ACCELERATOR ONLY") container type label may be data containers for intermediate results which are generated by the accelerator system while performing a data analysis. The first DBMS may not be optimized for efficiently retrieving intermediate results from such a data container, so data traffic can be reduced. In addition, the second container type label ("ACCELERATOR ONLY") may be assigned to second data containers which are configured for storing data that will—at least usually—not be required by the first DBMS or by a client. For example, a client may be interested in a final result of an analysis, but not necessarily in an intermediate result, so the intermediate result may be stored in a second data container whose second metadata in the catalogue has assigned the second container type label. The intermediate results generated by the accelerator system and stored to such a second data container do not have to be synchronized with the data contained in the first DBMS, and the distributed system does not transfer data from second data containers having assigned the second container type label to the first DBMS.

According to some embodiments, the third container type label "ACCELERATED" associated with first metadata of a first data container 124.1 indicates that the data content of the first data container is allowed to be stored (and may already have been stored) as a copy 124.2 a second data container assigned to the first data container. In some embodiments, the third container type label "ACCELERATED" may also be associated with the second metadata of a second data container to indicate that the data content of the second data container is a copy a first data container assigned to the second data container. Thus, a first data container whose first metadata has assigned a third container type label may have assigned a second data container configured to receive and store a copy of the data content of the first data container.

According to some embodiments, the single interface provides any write DML statement (for example INSERT, UPDATE, DELETE) directed at a data container having assigned the third container type label "ACCELERATED" to the first DBMS. The first DBMS executes the provided write DML statement on the first data container comprising the original data. Any changes imposed by the write DML statement may be automatically replicated to a corresponding second data container being assigned to the first data container in the catalogue 166 and being configured to store a data copy of the first data container. For example, all changes done to a first data container having assigned the third container type label "ACCELERATED" might be captured by some system component, for example a daemon supervising all changes done to the first data container. The captured changes may be replicated and applied to a corresponding second data container having assigned the second container type label "ACCELERATED" in real time or near real-time.

Alternatively, the second data container may contain a point-in-time copy of the data of the first data container. The point-in-time copy may be updated on a regular basis, for example once a week. The first data container assigned to the second data container contains real-time data. In this scenario, an automated synchronization of the second data container may or may not be executed. If the single interface determines that a received database query comprises a read DML statement (for example a SELECT statement) directed at a data container having assigned the third container type label ("ACCELERATED"), the single interface interoperates with an optimizer module (also sometimes referred to more simply as "optimizer") 126 of the first DBMS in order to dynamically determine if the read DML statement directed at a data container having assigned the third container type label should be provided to the first DBMS for executing the read DML statement on the first data container or should be dispatched to the accelerator system for executing the read DML statement on the second data container assigned to the first data container and comprising a copy of the data content of the first data container. For example, the optimizer may automatically evaluate the read DML statement and other criteria to dynamically predict if the read DML statement will be processed faster in the accelerator system than in the first DBMS. In case the read DML statement is predicted to be executed faster in the accelerator system, the single interface will dispatch the read DML statement to the accelerator system. Otherwise, the single interface will provide the read DML statement to the first DBMS for execution.

The features may be advantageous as the performance of query execution is increased at least for the read DML statements. An ACCELERATED first data container is still completely owned by the first DBMS, but contrary to the BASE containers, the data content of ACCELERATED first data containers is replicated to the accelerator system and may be stored in a different format there to speed up the execution of read DML statements. As the read DML statements do not impose any changes to the data in the second data containers, complex protocols for synchronizing transaction commit events are not necessary for the type of statements. According to some embodiments, the client application is enabled to override this decision of the single interface.

According to other embodiments, the first DBMS or one of its components, for example the optimizer module 126, is configured to dynamically determine if a particular statement should be executed in the first DBMS or in the accelerator system. For example, the single interface may be configured to decompose a query 140 into individual database statements. Then, the single interface determines, for each of the individual statements, if the statement is a DML statement or a DDL statement. In case the statement is a DML statement, and in case the statement is directed at a container having assigned the third container type label "ACCELERATED", the single interface determines, alone or in interoperation with the first DBMS or a component 126 thereof, if the statement should be dispatched to the accelerator system or not.

The optimizer module 126 may automatically evaluate one or more additional criteria for deciding if a particular read DML statement should be dispatched to the accelerator system or not. For example, the optimizer 126 may predict the execution time of the read DML statement in the first DBMS and in the accelerator system. Some of the criteria may be the type of the database statement (for example OLTP or OLAP) and the type of query for which the first DBMS or the accelerator system are optimized for. According to some embodiments, the first DBMS is optimized for processing a particular type of database query while the accelerator system is optimized for a different type of database query. The statement may belong to a particular one of the query types and may be dispatched by the single interface to that one of the sub-systems of the distributed system which is optimized for processing the query type the statement belongs to. In some further examples, the criteria may also comprise hardware characteristics of the IT-infrastructure hosting the first DBMS and the accelerator system. The optimizer may determine current hardware characteristics of the IT-infrastructure hosting the first DBMS and/or the IT-infrastructure hosting the accelerator system, the network bandwidth of a network connection between the first DBMS and the accelerator system, a latency time of replicating data changes from the first DBMS to the accelerator system, or the like. The decision may depend on the predicted statement execution times in the first DMBS and in the accelerator system. The prediction of the execution time by the optimizer may take into consideration the hardware characteristics (CPU load, amount of available memory or storage, etc.). If a particular read DML statement is predicted to be executed in the accelerator system quicker than in the first DBMS, it is dispatched to the accelerator system. Otherwise, it is executed in the first DBMS.

According to some embodiments, the first DBMS or a module 130 thereof may be configured for retrieving the results of each statement from the first DBMS and/or from the accelerator system and to merge all received results for computing a complete, final result (see FIG. 2, 204) that is returned to a client 102. This may be beneficial, because a first DBMS and an accelerator system may be speed-optimized for different queries, for example the first DBMS may be optimized for transactional workloads with high update rates and very high transaction rate and the accelerator system may be weak on updates but may be optimized for analytical queries. By dynamically deciding for each kind of statement and by taking into consideration current hardware characteristics, the total time for processing a query may significantly be reduced.

According to other embodiments, the first DBMS is configured to manage the processing of "mixed read transactions". A "mixed read transaction" comprises database statements performing a read operation, for example a SELECT operation, on first data containers and comprises database statements performing a read operation, for example a SELECT operation, on second data containers. It is also possible that a "mixed read transaction" comprises one or more statements performing either a write operation on first data containers or performing a write operation on second data containers (but not both on first and second data containers) in addition to the read operations. For example, the module 130 may be configured to decompose a transaction specified in query 140 into individual database statements. Then, the first DBMS determines, for each of the individual statements, if the statement is a DML statement or a DDL statement. In case the statement is a DML statement, the first DBMS will execute all DML statements which must access or should access a first data container and will dispatch all DML statements which must access or should access (because they run faster on the accelerator than on the first DBMS) the accelerator system to the accelerator system for execution. The first DBMS may then retrieve the results of each statement from the first DBMS and from the accelerator system and merge all received results for computing a complete, final result (see FIG. 2, 204). This may be beneficial in particular for quickly executing database statements of the types set forth in the following three (3) paragraphs:

INSERT into a first data container (for example a table in the first DBMS whose first metadata is labeled with "BASE") via SELECT from a second data container (for example a table in the accelerator system whose second metadata is labeled with "ACCELERATOR ONLY").

INSERT into a second data container (for example a table in the accelerator system whose second metadata is labeled with "ACCELERATOR ONLY") via SELECT from a first data container (for example a table in the first DBMS whose first metadata is labeled with "BASE").

SELECT X from a first data container (for example a table in the first DBMS whose first metadata is labeled with "BASE") JOIN SELECT Y from a second data container (for example a table in the accelerator system whose second metadata is labeled with "ACCELERATOR ONLY").

According to some embodiments, the single interface determines for each DML statement contained in a received database query if the DML statement shall be processed by the first DBMS or shall be dispatched. The determining comprises deciding to dispatch every DML statement configured to access one of the second data containers having assigned the second or third container type label to the accelerator system. This may be beneficial as data processing operations may be delegated, whenever possible, to the accelerator system, thereby saving computational resources of the IT environment hosting the first DBMS. According to some embodiments, the first DBMS processes the DML statement on the data 118.1 stored in the first DBMS if the DML statement is not dispatched to the accelerator system.

According to some embodiments, the received database query comprises a DDL statement which specifies that a new second data container shall be created in the accelerator system. The updating of the second metadata MD2 in the metadata catalogue 116 comprises storing, by the accelerator system, a definition of the structure of the created new second data container and a container type label ("ACCELERATOR ONLY") in the catalogue. The container type label is a second container type label and indicates that the created container is solely stored in the accelerator system. The newly created second data containers may be used for storing intermediate results generated during a stepwise execution of a computational tasks, for example a data analysis task, in the accelerator system. Preferentially, the stored intermediate results are not transferred to the first DBMS, or only upon an explicit request of the first DBMS. This may be beneficial, because although the intermediate results are not transferred to the first DBMS and although the first DBMS does not comprise a copy of the second data containers having stored the intermediate results, the first DBMS is in full control of the intermediate results and in control of the respective calculation steps as it controls the dispatching of statements and controls the transactional context of the transaction comprising each of the dispatched and non-dispatched statements. A client may access the intermediate results via the single interface 138, because the second metadata of the second data containers allow executing database statements on the intermediate results in the second data containers. This reduces data traffic, because the intermediate results are communicated to the first DBMS only in response to an explicit request.

According to some embodiments, the accelerator system lacks any catalogue comprising metadata being descriptive of the structure of the second data containers 124.2, 128.2.

According to some embodiments, the method further comprises providing a transaction manager 144. The transaction manager is a component of the distributed system 112. For example, the transaction manager may be a component of the first DBMS or a component external to the first DBMS. The transaction manager is configured to manage begin, commit and rollback events of first, second and third database transactions. The first database transactions respectively comprise one or more database statements, for example DDL and/or DML statements, which are to be processed by the first database management system (for example because they access first data containers labeled with the first container type label "BASE"). The second database transactions respectively comprise one or more database statements, for example DDL or DML statements, which are to be processed by the accelerator system (for example because they access second data containers labeled with the second ("ACCELERATOR ONLY") or third ("ACCELERATED") container type label). The third database transactions respectively comprise at least one database statement, for example a DDL and/or DML statement, which is to be processed by the first database management system and at least one database statement which is to be processed by the accelerator system. Thus, in some embodiments, the transaction manager may act as a single central instance for managing transactions to be executed in the first DBMS and/or in the accelerator system.

Thus, the processing of any dispatched DML statement which access data in second data containers is performed in a transactional context which is managed and maintained by the transaction manager. The transaction manager may act as a single, central transaction manager of the distributed system. The transaction manger is the only master for transactions executed both in the first DBMS and in the accelerator system. In case of an error when processing a statement directed on data of a second data container, the transaction manager may rollback the whole transaction comprising the statement, the statement also including statements which may have been executed on a first data container. For example, in case the transaction manager determines a ROLLBACK event of a transaction that is currently performed in the accelerator system, the transaction manager may instruct the accelerator system to roll back the transaction. So the protocol is under control of the transaction manager. An integral transaction manager of the first DBMS may be used as the transaction manager and the transactions performed in the accelerator system may be under the control of the first DBMS. The distributed system does not need and does not make use of a commit protocol which requires two-way communication between the first DBMS and the accelerator in order to guarantee transactional consistency, thereby avoiding related protocol complexity and computational overhead. A "two-way communication commit protocol" as used herein is a commit protocol which requires two-way communication between the involved systems. Thus, a two-way communication commit protocol may communicate commit events in two directions. When a central transaction manager is used, the control commands may be communicated unidirectionally. For example, the accelerator system may perform several INSERT operations on a second data container having assigned the second container type label "ACCELERATOR ONLY". The accelerator system may receive a ROLLBACK command from the transaction manager, for example because a write operation on a first data container which is part of the transaction failed. As a consequence, the accelerator system aborts the INSERT statements to be executed on the second data containers.

Using only a single component for transaction management both in the first DBMS and in the accelerator system may be beneficial, because no Two-Phase-Commit Protocol (2PC) or Three-Phase-Commit-Protocol (3PC) need to be implemented or executed (as is the case, for example, in federated database systems, in order to keep the data 118.1 and the data copy 118.2 in sync.

According to some embodiments, the accelerator system lacks any transaction management logic or it may merely comprise a disabled transaction management logic which is not used for managing transactions performed on the second data containers. If the accelerator system lacks any transaction management logic, the transaction manager 144 does not send any write DML statements to the accelerator system before the transaction manager determines that the transaction shall be performed in the accelerator system and that no rollback event will be received for the transaction. For example, the write DML may not be scheduled to the accelerator system by the transaction manager before the COMMIT is received from the client (so it has just checked that the DML could be processed). This may be beneficial as complex protocols such as the MVCC (multi version concurrency control) protocols may not be required for ensuring data consistency as the transaction manager may act as a single central manager of transactions to be execute in the first DBMS and in the accelerator.

According to some embodiments, the generation of the trigger signal for triggering the accelerator system to create, delete or update one of the data containers stored in the accelerator system comprises translating, by the first DBMS, the DDL statement into a translated DDL statement and forwarding the translated DDL statement to the accelerator system. The translation may comprise adapting the syntax of the DDL statement to requirements of the accelerator system. The creating, updating or deleting, by the accelerator system, comprises executing the translated DDL statement by the accelerator system. This may be beneficial, as the distributed system may support different SQL dialects. Thus, a plurality of different database management systems and/or accelerator system modules may freely be combined which are respectively optimized for quickly processing different kinds of database queries.

According to some embodiments, the transaction manager 144 creates, for each database transaction comprising at least one database statement which shall be processed by the accelerator system, one or more database connections between the first database management system and the accelerator system. The first database management system uses the created one or more database connection for the dispatching of any one of the statements being contained in the transaction. The transaction manager may close the one or more connections upon a commit event of one of the statements of the transaction for which the one or more connections were created. This may be beneficial as the coupling of the connection management to the transaction management may help to ensure transactional isolation and data consistency.

According to some of the embodiments, the transaction manager creates, for each of the DML statements which shall be dispatched to the accelerator system for being processed, a primary database connection between the first DBMS and the accelerator system.

According to other embodiments, the transaction manager creates, for multiple consecutively received DML statements which shall be dispatched to the accelerator system for being processed and which perform a write operation (for example an INSERT, UPDATE or DELETE operation), a single primary database connection between the first database management system and the accelerator system. In addition, or alternatively, the transaction manager creates, for each of the DML statements which shall be dispatched to the accelerator system for being processed and which perform a read (for example a SELECT) operation, a secondary database connection between the first database management system and the accelerator system. For example, the first DBMS may act as a database client to the accelerator system, the database client being connected to the accelerator system via one or more primary and/or one or more secondary database connections. The primary and the secondary database connections are two types of database connections which are executed according to different chronological schemes: The creating of the primary database connections and the executing of the database statements for which the primary database connections were created are executed sequentially in accordance with the chronological sequence of the statements in a requested transaction. To the contrary, the database statements for which the secondary database connections were created are executed in parallel, thereby using the secondary database connections which are opened and maintained concurrently.

In some embodiments, this may have the beneficial effect of increasing the performance of database queries: read (SELECT) statements may be executed in parallel using secondary database connections. Read operations may be executed in parallel without violating transactional consistency, because the read data is not manipulated. To the contrary, begin statements, commit statements and write DML statements of a particular transaction may be communicated and executed via a single primary database connection or a set of sequentially executed primary database connections. Thus, data retrieval may be accelerated and the blocking of DML statements and associated delay times may be prevented.

According to some embodiments, the transaction manager begins a transaction and opens a corresponding primary database connection between the first DBMS and the accelerator system upon receiving a write DML statement that is part of a query. The write DML statement may be, for example, an UPDATE, INSERT or DELETE statement. All succeeding write DML statements which may be received as part of the query or as part of a succeeding query are executed within the transaction by using the one primary database connection. Upon receiving a first read DML statement, the transaction manager triggers the commit of all write DML statements preceding the read statement. After the commit event for the transaction comprising the preceding write DML statements, the primary database connection having been created for the transaction is closed. The received first read DML statement is executed by using a secondary database connection, the secondary database connection being created or provided from a pool of secondary connections by the transaction manager. If the transaction manager receives further read DML statements succeeding the first read DML statement, the further read DML statements are executed in parallel via other secondary database connections created by the transaction manager or provided from a pool of secondary transactions by the transaction manager. If a new write DML statement is received that belongs to the same transaction as the preceding read DML statements, the transaction manager may create a copy of the second data containers to be accessed selectively by read DML statements of the transaction via secondary database connections in parallel.

According to other embodiments, the transaction manager automatically initiates the execution of a transaction in the accelerator system upon processing the first statement in the requested transaction that will access a second data container having assigned a second or third container type label (ACCELERATED or ACCELERATOR ONLY). The particular statement and all succeeding statements are executed in the accelerator system in the same transactional context. The borders of a transactional context are defined by a begin event and a commit or a rollback event. Transactions solely comprising statements directed at first data containers do not trigger the start of a new transaction in the accelerator system. This may have the beneficial effect of reduced network traffic. Nevertheless, the isolation levels SERIALIZABLE and REPEATABLE READ can be provided by this transactional control strategy.

According to other embodiments, the transaction manager automatically initiates the execution of a transaction in the accelerator system when the first statement in the requested transaction is processed which is a write DML statement (INSERT, UPDATE, DELETE). The particular write DML statement and all succeeding statements will be performed as a single transaction in the accelerator system. All preceding read DML statements may run in their own transactional context in the first DBMS. This approach is associated with very low computational overhead for transactional control and delegation, but does not support isolation levels SERIALIZABLE and REPEATABLE READ. However, the isolation levels are usually not required in an analytical system.

According to some embodiments, the method comprises creating, by the accelerator system, a copy of a second data container that is currently accessed by a mixture of write DML and read DML statements, the mixture of write and read DML statements belonging to the same transaction. For example, the creating of the copy of the second data container can be triggered by the processing of the first write DML statement of the transaction. The accelerator system executes all write DML statements of the transaction on the original second data container and executes all read DML statements in parallel on the created copy of the second data container ("spill-to-disk"). In some embodiments, read DML statements which have already started when the copy of the second container is created may be finished on the original second data container. The results of the parallel execution of the read DML statement may be communicated, for example, in parallel to the first DBMS via the secondary database connections. Preferentially, the accelerator system deletes the copy of the second data container upon a rollback of the transaction or upon a commit event of the transaction.

Preferentially, the creation and closing of a connection and the starting of performing a transaction in the accelerator system is performed regardless of any database queries received from a client. A query may specify one or more database transactions and each transaction may comprise one or more database statements. The database connections between the first DBMS and the accelerator are opened and closed regardless of whether a particular database statement is at the beginning or end of a query. Rather, for example, a primary database connection is opened for a particular transaction, whereby the transaction manager defines and controls the begin, commit and rollback aspects of the transaction. The primary connection created for the particular transaction is closed when the transaction commits or rolls back. In case a transaction comprises multiple statements distributed in multiple database queries, the transaction manager maintains and reuses the primary connection for performing all the multiple database statements. Thus, not each new query 140 of a client system may trigger the creation of a new data connection. This may reduce computational overhead for transaction and connection management.

The information being indicative of structural features of the created second data container may comprise the number of the columns of the second data container, column names and/or data types of the columns of the second data container and/or one or more database constraints. The one or more database constraints may comprise a constraint for one or more of the columns of the created second data container and/or a database constraint for the whole created second data container. A database constraint may be, for example: "NOT NULL"—value(s) in a column must not be NULL; UNIQUE—value(s) in specified column(s) must be unique for each row in a table; PRIMARY KEY—value(s) in specified column(s) must be unique for each row in a table and not be NULL; FOREIGN KEY—value(s) in specified column(s) must reference an existing record in another table (via its primary key or some other unique constraint); CHECK-EXPRESSION—an expression is specified, which must evaluate to true for constraint to be satisfied.

According to some embodiments, the single interface is configured for receiving a database query. If the received query comprises a data manipulation language statement configured for accessing at least one of the second data containers having assigned the second container type label. For example, the second data container may comprise a result having been calculated by the accelerator system when performing the computational task. The single interface dispatches the data manipulation language statement to the accelerator system. For example, the single interface may access the catalog 116 in order to determine if the statement accesses data that is solely stored in first data containers or solely stored in second data containers.

The detection of the trigger event may be, for example, the receiving of the query. The query comprises an indication of the one of a plurality of stored procedures stored in the accelerator system that shall be called in response to the receipt of the query. The query may fetch some data from the first DBMS and may trigger the calculation and retrieval of the result from the accelerator system.

According to some embodiments, if the data manipulation language (DML) statement is not dispatched to the accelerator system, the first DBMS processes the DML statement on the data 118.1 stored in the first database management system. This may be beneficial as the processing of DML statements in the first DBMS may reduce network traffic caused by retrieving the results or intermediate results from the accelerator system. In a further beneficial aspect, the first DBMS and the accelerator system may be optimized for different queries and statements, for example OLTP and OLAP statements.

According to some embodiments, the first DBMS comprises a transaction manager 144. The transaction manager is a component of the distributed system 112 and is configured to manage begin, commit and rollback events of first and second database transactions. The first database transactions respectively comprise one or more database statements, for example data definition language (DDL) or DML statements to be processed by the first database management system. The second transactions respectively comprising one or more database statements, for example DDL or MDL statements, to be processed by the accelerator system. In some embodiments it may also be possible that the transaction manager manages database queries comprising a mixture of database statements to be processed by the first DBMS and the accelerator system. Thus, the transaction manager may act as a central instance for controlling the begin and commit or rollback of transactions to be executed in the first DBMS and of transactions to be executed in the accelerator system.

This may be advantageous, as the use of a central instance for managing transactions both in the first DBMS and the accelerator system may reduce the computational overhead which is required, for example, in federated DBMS using multiple independent transactional control modules, in order to ensure consistency of the data changes imposed by transactions which are dispatched to a particular sub-system of the federated DBMS.

According to some embodiments, the transaction manager 144 starts, in response to the trigger event, a transaction for creating the complete second metadata. The creation of the incomplete second metadata being executed within the transaction. The transaction manager commits the transaction in response to the creation of the complete second metadata. Only in case the transaction committed successfully, the single interface makes the complete second metadata accessible to one or more clients for performing second transactions on the data having been filled into the created second data container.

For example, the act of creating the incomplete second metadata may be the first statement executed within the transaction. The structural information of the second data container to be created by the accelerator system may be gathered and returned to the first DBMS 110 while the transaction is maintained by the transaction manager 144. After having supplemented the incomplete second metadata with the structural information, the transaction manager causes the transaction to commit. In case an error occurs or no structural information is obtained within a predefined time interval, the transaction manager causes a rollback action of the transaction, thereby deleting the incomplete second metadata from the catalogue. This may be advantageous, as it is ensured that a client may access the second data container created dynamically by the accelerator system and may "see" the second metadata of the second data container only after a successful commit event of the transaction. If an error occurs, the client does not "see" the metadata and cannot access the corresponding second data container. Thus, errors resulting from accessing non-existent or erroneously structured second data containers can be avoided with only very low computational overhead.

According to some embodiments, the dynamically identified information being indicative of the structural features of the created second data container is identified by the accelerator system by evaluating data 124.2, 128 that is stored in other second data containers or by evaluating data that is a derivative thereof, the evaluation being performed when executing the program logic. The derivative may be, for example, an intermediate result of a previously executed step which is part of the computational task currently performed by the accelerator system. Thus, the structure of the created second data container and also the dynamically identified information depend on the result of a dynamic evaluation of input data by the accelerator system. Delegating the executing of the computational task to the accelerator system and creating the incomplete and complete second metadata as describe may render the transfer of the input data, for example intermediate result of a multi-step computational task, to the first database management system unnecessary, thereby reducing network traffic.

According to some embodiments, the single interface is an integral part of the first database management system. For example, the single interface can be the SQL interface of the first DBMS. According to alternative embodiments, the single interface is a separate program module that may be hosted on the same or a different computer than the first database management system and/or than the accelerator system. In this case, the step of providing a database statement to the first database management system comprises a step of dispatching the database statement to the first database management system, for example via a network. In any case, the single interface has at least read access to the catalogue 116 in order to evaluate the catalogue and for determining if a particular statement is directed at a first or a second data container.

The transaction manager may be configured to manage begin, commit and rollback events of first and second database transactions. The first database transactions respectively comprise one or more database statements, for example DDL and/or DML statements, which are to be processed by the first database management system (for example because they access first data containers labeled with the first container type label "BASE". The second database transactions respectively comprise one or more database statements, for example DDL or DML statements, which are to be processed by the accelerator system (for example because they access second data containers labeled with the second ("ACCELERATOR ONLY") or third ("ACCELERATED") container type label). In some embodiments, the transaction manager is also capable of and configured for processing mixed read transactions.

Thus, the processing of any dispatched DML statement which access data in second data containers is performed in a transactional context which is managed and maintained by the transaction manager. The transaction manager may act as a single, central transaction manager of the distributed system. The transaction manger is the only master for transactions executed both in the first DBMS and in the accelerator system. In case of an error when processing a statement directed on data of a second data container, the transaction manager may rollback the whole transaction comprising the statement, the statement also including statements which may have been executed on a first data container. For example, in case the transaction manager determines a ROLLBACK event of a transaction that is currently performed in the accelerator system, the transaction manager may instruct the accelerator system to roll back the transaction. So the protocol is under control of the transaction manager. An integral transaction manager of the first DBMS may be used as the transaction manager and the transactions performed in the accelerator system may be under the control of the first DBMS. The distributed system does not allow a two-way communication commit protocol between the first DBMS and the accelerator, thereby avoiding related protocol complexity and computational overhead. For example, the accelerator system may perform several INSERT operations on a second data container having assigned the second data container type label "ACCELERATOR ONLY". The accelerator system may receive a ROLLBACK command from the transaction manager, for example because a write operation on a first data container which is part of the transaction failed. As a consequence, the accelerator system aborts the INSERT statements to be executed on the second data containers.

Preferentially, the complete second metadata is published only in case of a successful commit event. To "publish" metadata as used herein means that the single interface or any other entity accessing and evaluating the catalogue 116 is enabled to evaluate the metadata and to address and dispatch database statement to a first or second data container that is described by the metadata. This may be beneficial as the distributed system may be protected against data inconsistencies, because no database statement can be performed on the created second data container before the "commit" event makes the complete second metadata visible to a client.

According to some embodiments, in case the creation of the incomplete second metadata, the creation of the second data container or the supplementing of the incomplete second metadata fails, the transaction manager 144 performs a rollback operation for the transaction, thereby triggering the deletion of the incomplete second metadata and/or the deletion of the created second data container, if any. This may be beneficial, as it prevents the catalogue from being cluttered with incomplete metadata resulting from stored procedure calls which failed for various reasons, for example due to a power outage, due to a broken network connection or the like. This may ensure that such incomplete second metadata that will never be completed do not consume valuable storage space and will not reserve names or namespaces for processes which will never commit. Thus, the need for automatically identifying alternative names and namespaces and/or the need for managing a large catalogue with a large number of incomplete metadata may be avoided and computational overhead may be reduced.

According to some embodiments, the single interface 138 of the system may be implemented as the SQL application interface of the first DBMS.

According to some embodiments, the first DBMS comprises a program module (also sometimes herein referred to as an "optimizer") 126 for automatically planning how a particular database statement should be executed efficiently in the first DBMS. In addition or alternatively the first DBMS also comprises a catalog manager module 135 being configured to access the catalog for creating the incomplete second metadata and for supplementing the incomplete second metadata with structural information received from the accelerator system (sometimes herein more simply referred to as the "accelerator") 120. Accelerator 120 includes MD2 copy 142 and data copy (or, more simply, "data") 118.2. The process module 130 may be configured for processing DDL statements for creating first and second metadata. In case a DDL statement specifies that a second data container shall be created in accordance with the DDL statement, the module 130 generates a trigger signal that causes the accelerator system 120 to create the second data container in the accelerator system in accordance with the DDL statement. In case a DDL statement specifies that a first data container shall be created in accordance with the DDL statement, the module 130 generates the first data container in the first DBMS 110 in accordance with the DDL statement.

Figure 2:
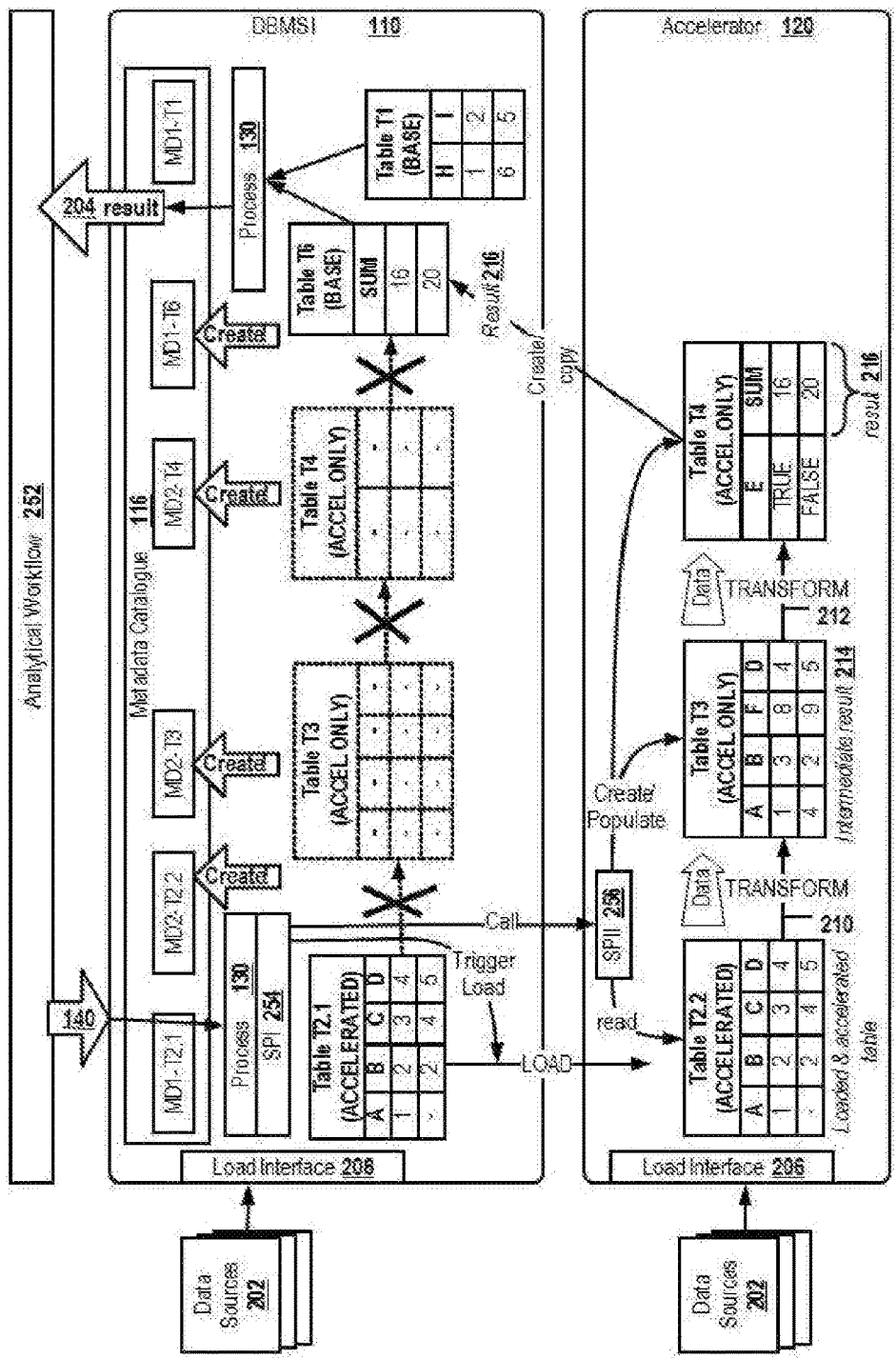
FIG. 2 depicts the interaction between the first database management system and the accelerator system in greater detail.

According to some embodiments, the program logic contained in the accelerator system 120 comprises one or more stored procedures (see FIG. 2, element 256). The one or more stored procedures are configured for calculating a result for the computational task.

According to some embodiments, the computational task is a data analysis task, for example a clustering task, a machine learning task, a training task (for example for neural networks), a principal component analysis task, or the like. The trigger event that triggers the first DBMS to cause the accelerator system to execute the program logic may be a request by a client, a cron job, or any other kind of event the first DBMS is configured to become aware of and that is indicative of the computational task which shall be executed.

According to some embodiments, the first DBMS may be configured to access and/or manage an assignment of the stored procedures 256 to different computational tasks. In the assignment, the one or more stored procedures are respectively assigned to one out of a plurality of computational tasks. The trigger event is assigned to one out of the plurality of computational tasks. In response to the detection of the trigger event, the first DBMS identifies the one of a plurality of computational tasks which is assigned to the detected trigger event and identifies at least one of the one or more stored procedures which is assigned to the one identified computational task. Thus, the first DBMS may be able to dynamically react to different requests and corresponding trigger events and may delegate the execution of various computational tasks to the accelerator system by calling different stored procedures.

According to some embodiments, the data filling the second data container are the result of performing the computational task. The computational task may be performed by the accelerator system in multiple steps. In some embodiments, the performing of each step comprises the following operations (not necessarily in the following order):

OPERATION (1): triggering, by the accelerator system or by the trigger event, the first database management system to create further incomplete second metadata for a further second data container, the further second data container being absent from the accelerator system at the moment of creating the further incomplete second metadata, the incomplete second metadata comprising a name or a namespace for the further second data container and lacking structural information of the further second data container.

OPERATION (2): dynamically identifying, by the accelerator system, further information, the further information being indicative of structural features of the further second data container.

OPERATION (3): transmitting the dynamically identified further information to the first database management system.

OPERATION (4): creating, by the accelerator system, the further second data container for which the further incomplete second metadata was already created in accordance with the structural features.

OPERATION (5): storing the created further second data container in the accelerator system.

OPERATION (6): filling the created further second data container with an intermediate result calculated in the step of the computational task.

Depending on the embodiment, the further information being indicative of structural features of the further second data container may be transmitted to the first DBMS before or after the second data container was created. For example, data stored in other data containers may be analyzed when executing a step of a computational task implemented by the program logic to determine the number and/or names of columns of the second data container that shall store an intermediate result generated by executing the step. The dynamically identified information may be indicative of structural features of the further second data container that is to be created.

In response to the transmission of the dynamically identified further information, the first DBMS supplements the incomplete further second metadata with the transmitted further information, thereby creating further complete second metadata. The further complete second metadata is descriptive of the name and structure of the created further second data container.

For example, the accelerator system may trigger the first DBMS to create the further incomplete second metadata for a further second data container (which does not exist yet) by sending a message to the first DBMS which instructs the first DBMS to create the further incomplete second metadata. For example, the accelerator system may determine while executing an analysis that 6 clusters were identified in the analyzed data by applying the particular clustering algorithm CLUST4. The analyzed data may have a particular name, for example "dataset-1". The accelerator system may send a message to the first DBMS, the message instructing the first DBMS to create 6 incomplete second metadata for 6 respective and not yet existing second data containers. The names contained in the 6 incomplete metadata may be indicated by the message and may be, for example, "CLUST4_cluster_1_dataset1", "CLUST4_cluster_2_dataset1", "CLUST4_cluster_3_dataset1", . . . , "CLUST4_cluster_6_dataset1". Then, the respective second data containers may be filled by the accelerator system with the analytical data of the 6 identified clusters. For example, the second data containers may be filled with nodes and edges belonging to a particular cluster and with additional information having been obtained by the clustering algorithm. This approach may be particularly advantageous for computational task where the number and structure of the second data containers to be created are not known in advance.

Alternatively, the trigger event that caused the accelerator system to execute the program logic may also trigger the first DBMS to create the further incomplete second metadata for a further second data container. For example, clustering algorithm CLUST8 may be a clustering algorithm where the numbers of clusters, also referred to as "classes", are known in advance. For example, the clustering algorithm CLUST8 may be configured to analyze ACCELERATOR ONLY tables 128 and ACCELERATOR tables 124.2 in order to identify exactly five clusters of data records. Thus, at the moment when a trigger event for performing clustering algorithm CLUST8 is detected by the first DBMS, the first DBMS may already create five incomplete sets of second metadata for the corresponding and not yet existing five second data containers. The incomplete five sets of second metadata may comprise names such as "CLUST8_cluster_1_dataset1", "CLUST8_cluster_2_dataset1", . . . , "CLUST8_cluster_5_dataset1".

According to some embodiments the single interface dispatches each database statement addressing any one of the further second data containers for which the further complete second metadata was created, to the accelerator system. The accelerator system performs each dispatched database statement on the intermediate result having been filled into the further second data container addressed by the dispatched database statement.

Thus, in a beneficial aspect, the intermediate results do not have to be transferred to the first DBMS per default in order to enable the first DBMS to evaluate the intermediate results in order to extract structural information of data containers which shall be used to store the intermediate results. Rather, as the creation of the second data containers in dependence on the intermediate results generated by a previous data processing step is delegated to and is under the control of the accelerator system, and as the second metadata necessary to access the second data containers is created by the first DBMS in interoperation with the accelerator system, data traffic is reduced. However, in case the first DBMS or a client explicitly request to receive a particular intermediate result stored in a second data container whose second metadata was already completed, the requested data can be retrieved as described.

According to some embodiments each further second data container is a temporary data container. After having performed the computational task, the accelerator system automatically deletes each of the further second data containers having been created during the performing of the computational task. Then, the accelerator system triggers the first database management system to delete each of the further complete second metadata having been created upon performing the computational task. For example, the second data containers may be temporary tables which are automatically deleted at session end of a session between the client application and the DBMS, the temporary data container having been created during the session. Alternatively, the accelerator system may implement other automated approaches for determining that the content of the second data container and the second data container are no longer required. In this case, the accelerator system may also trigger the deletion of the corresponding second metadata from the catalogue 116.

According to some embodiments, the method comprises transferring any one of the intermediate results from the accelerator system to the first database management system only in response to an explicit request of the first DBMS to retrieve a particular one of the intermediate results of the computational task. In addition, or alternatively, the first database management system and/or a client uses the transferred further information of the one of the further second containers comprising the particular intermediate result for reading and/or modifying the particular intermediate result. For example, the first DBMS and/or the client may submit database queries which are specified such that they will access particular columns of a further second data container whose column names are transmitted to the first DBMS as part of the transmitted information for supplementing the incomplete second metadata of the further second data container.

FIG. 2 depicts the interaction between the first database management system and the accelerator system of the above mentioned embodiments in greater detail. One of the clients 102, 104, 105 may implement and execute an analytic data processing workflow (also sometimes referred to herein as "analytical workflow") 252. At a particular moment within that workflow, the client may send a database query 140 or another type of query to the single interface 138 of the distributed system. The single interface provides the received query 140 to the first DBMS to process (or "module") 130 of the first DBMS. Receiving the query 140 by the first DBMS may be a trigger event (see FIG. 2 at Table T2.1, Trigger Load arrow and LOAD arrow) for calculating a particular computational task, for example for performing a particular clustering algorithm on data which is already stored in existing second data containers and/or that is retrieved from external data sources 202 by the accelerator system 120. Depending on the embodiment, the accelerator system may retrieve the input data from the external data sources directly via load interface 206 of the accelerator system or indirectly via the first DBMS and its load interface 208. For example, at the moment of receiving the query 140, the second data container table T2.2 may already be filled with some input data that is to be analyzed by the requested clustering algorithm. The clustering algorithms may be implemented in the form of one or more stored procedures 256 stored in and maintained by the accelerator system 120. In response to the receiving of the query 140, the first DBMS creates incomplete second metadata for one or more second data containers and causes the execution of the stored procedures 256 which implement the requested clustering algorithm.

The stored procedures 256 implement a multi-step program logic. A first step comprises the transformation of the data contained in the table T2.2 into a different format and/or the transformation of the data into a derivative data set, for example an intermediate result. For example, the different format may comprise less or additional columns or may comprise modified data values reciting from for example a summarization, multiplication, aggregation or other kind of operation. The second data container table T3 may not exist in the accelerator system at the moment of receiving the query 140. However, the accelerator system may dynamically determine during the execution of the program logic 256 that the transformed data set generated in step 210 needs to be stored in a new second data container T3. As a consequence, the accelerator system may send a message to the first DBMS in order to trigger the first DBMS to create an incomplete second meta-data MD2-T3_incomplete. Alternatively, the first DBMS may have created the incomplete second meta-data MD2-T3_incomplete already in response to the receiving of the query 140 acting as the trigger event for performing the clustering algorithm. The accelerator system dynamically determines that the data set having been generated by transformation step 210 comprises a particular set of attributes. This information also comprises some structural information of the second data container T3 to be created. For example, each attribute "A", "B", "F" and "D" could be represented by respective and automatically determined column names "A", "B", "F" and "D" or "colA", "colB", "colF" and "colD", for example. The number of the attributes may be used as an indication of the number of columns (in this case: 4) of the second data container to be created. The accelerator system dynamically creates a second data container T3 having four columns and the above-mentioned column names, stores the result of transformation 210 into the container T3 and transmits the dynamically identified in structural information on table T3 (4 columns with column names "A", "B", "F" and "D" and reference numeral 214) to the first DBMS. The first DBMS receives the structural information and supplements the incomplete second meta-data MD2-T3_incomplete for table T3, thereby creating complete second meta-data MD2-T3_complete for table T3. After having finalized and committed the supplementing of the metadata, the metadata catalog 116 comprises all necessary information to enable a client or the first DBMS to access the table T3 in the accelerator.

The transformation results of step 210 are not communicated to the first DBMS 110 unless the first DBMS explicitly requests to receive the transformation results.

The data content of table T3 is transformed in a further step 212 into a further data set comprising attribute values for the attribute "E" and "SUM". The data set or parts thereof, for example the "SUM" attribute values may be the final result of the program logic, for example the clustering algorithm which may aggregate some values for some dynamically identified clusters. The creation of the second data container table T4 and its corresponding metadata MD2-T4_incomplete, MD2-T4_complete is performed by the accelerator system in interoperation with the first DBMS as described before for table T3.

Figure 3:
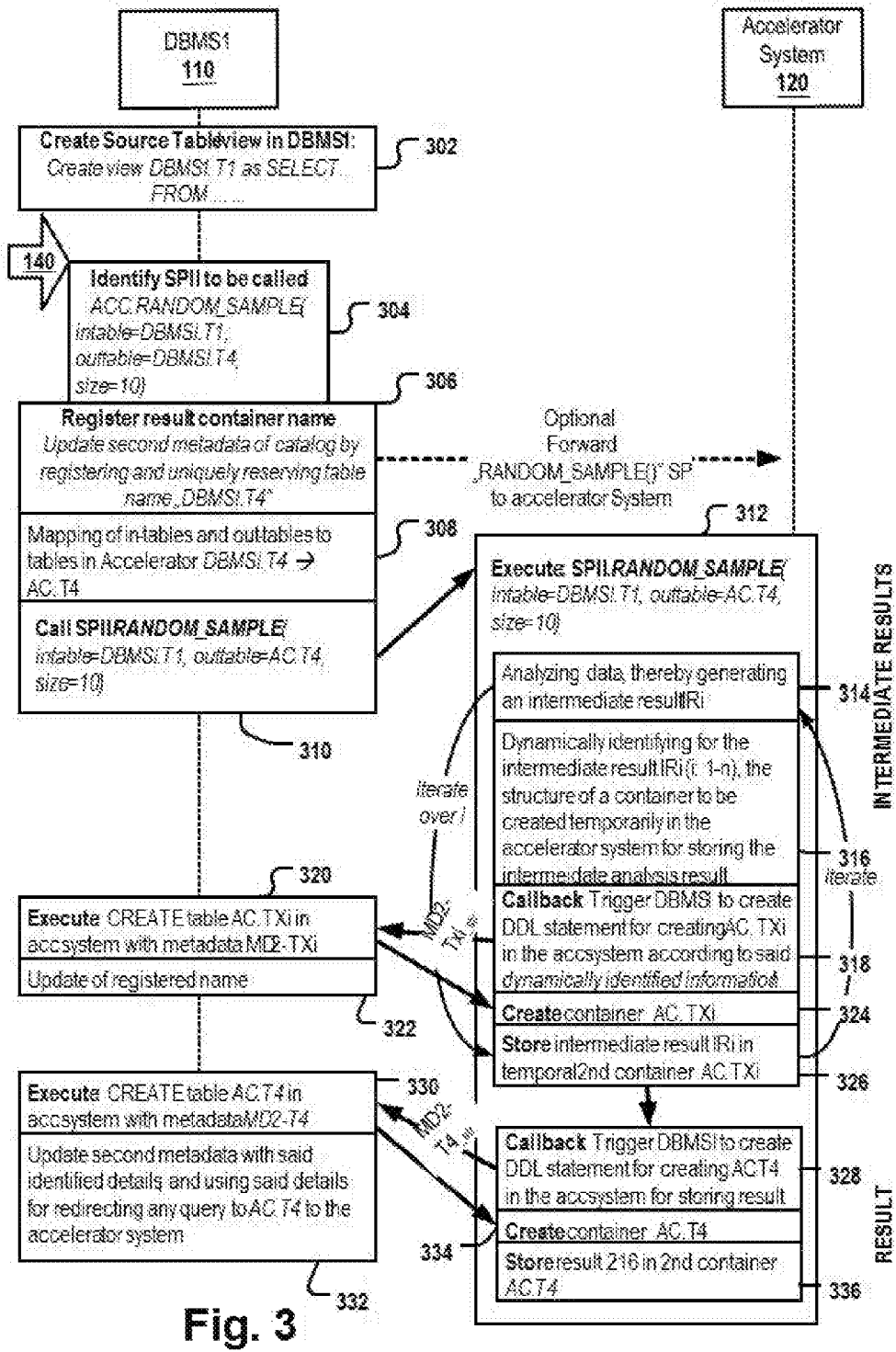
FIG. 3 depicts a flow chart of a method according to one embodiment of the invention.

The result 216 may be transferred to the first DBMS automatically or upon request (see FIG. 3 at table T6). The processing module 130 of the first DBMS may directly forward the results 216 to the requesting client or may combine and to merge the received result 216 with further data that is derived from first data containers, for example table T1, and/or from external data sources via load interface 208. The merged data may be returned to the client as final result 204.

The dotted table boxes T3 and T4 and the crossed-out arrows in the box representing the first DBMS indicate that the table T3 and T4 are not created as first data containers in the first DBMS but rather are created only in and by the accelerator system 120. Nevertheless, as the catalog 116 comprises both first meta-data MD1 for first data containers as well as second meta-data MD2 of second data containers, first and second data containers and their respective data content can be accessed via the single interface 138.

FIG. 3 depicts a flow chart of a method according to some embodiments of the invention. In a first step 302, the first DBMS may create a table or a view, for example table T1 depicted in FIG. 2, by means of a SELECT statement which may retrieve data from first and/or second data containers in order to fill one or more first data containers of the first DBMS. Then, the first DBMS may detect a trigger event 140 for performing a computational task. In response to the detection of the trigger event, the first DBMS identifies a particular program logic, for example a particular set of stored procedures 256, maintained by the accelerator system. In step 304, the first DBMS identifies the stored procedure ("SPI") 254 and stored procedure ("SPII") 256 to be called. In some embodiments, it is possible that the first DBMS 110 maintains the identified stored procedure 254 and automatically transfers a copy 256 of the identified stored procedure 254 from the first DBMS to the accelerator system in order to execute the stored procedure in the accelerator system. In other embodiments, the stored procedures 256 are solely maintained by the accelerator system.

The identified stored procedure may, for example, have the name RANDOM_SAMPLE and may require multiple arguments: a first argument may be "intable", a second argument may be "outtable". Further arguments may be possible, for example to specify multiple intables or multiple outtables or to specify the number or maximum size of clusters to be identified or any other parameter value that may be of relevance for performing the computational task. An "intable" is a first or second data container comprising input data for the stored procedure. An "outtable" is a first or second data container that shall receive and store a result or intermediate result generated by the stored procedure and that might not exist at the moment of calling the stored procedure. When calling the stored procedure, the first DBMS or a query (that is, trigger event 140) received from a client may specify the names of the first or second data containers which comprise the data that it should be used as input by the stored procedure 256 "RANDOM_SAMPLE" to be called.

In step 306, the first DBMS creates incomplete second meta-data comprising names or name spaces of second data containers which will be created by the accelerator system in the future when performing the called stored procedure. The names or name spaces may be known by the first DBMS because they were provided as arguments. It is also possible that the names are automatically computed from dynamically derived data such as session-IDs, a current time or date, the name of a data set to be evaluated, or the like. For example, creating incomplete second meta-data for the second data container T4 comprises updating the catalogue 116 by registering and uniquely reserving the table name "DBMSI.T4" for the second data container T4 to be created. The name of a first data container may be built as a combination of the name of the first DBMS and the container name. The name of a second data container may be built as a combination of the name of the accelerator system and the container name. In case a second data container comprises a copy of the data of a particular first data container, the names of the first and second data containers may differ only in respect to the name part being indicative of the first DBMS or of the accelerator system.

In a further step 308, the first DBMS maps the names of all first data containers being used as an intable or outtable argument to a corresponding second data container different only in respect to the name part being indicative of the accelerator system instead of the first DBMS. Thus, the outtable DBMSI.T4 being indicative of the first data container T4, which does not exist and will never be created in the first DBMS, is mapped to the second data container AC.T4 which is a second data container that does not exist yet but will be created when executing the stored procedures 256.

In step 310, the first DBMS causes the accelerator system to execute the program logic 256 that is configured to perform the computational task assigned to the detected trigger event 140. This may comprise calling the identified stored procedure 256 by the first DBMS, thereby using the above described arguments as input.

The execution of the stored procedure (shown at step 312 of FIG. 3) may comprise multiple, iteratively executed data analysis steps. In a first data analysis step 314, an intermediate result IRi may be calculated, whereby i is an integer number larger than 0 that is used as a counter. Multiple intermediate results may be calculated iteratively. For each intermediate result, the accelerator system dynamically identifies in step 316, information MD2-TXi_str being indicative of the structure of a second data container AC.TXi to be created in the accelerator system for storing a particular intermediate result IRi calculated in the previous step 314.

In step 318 the accelerator system sends the identified information MD2-TXi_str to the first DBMS (see step 320 in FIG. 3). This may be implemented in the form of the accelerator system executing a callback operation. The sending of the identified information to the first DBMS enables the first DBMS to supplement in step 322 the incomplete meta-data with the information MD2-TXi_str and to use the information MD2-TXi_str in combination with the name or namespace that has been reserved in step 306 for creating a data definition language (DDL) statement for creating the second data container AC.TXi in accordance with the identified structural information MD2-TXi_str and the reserved name. The first database management system executes the DDL statement in step 324 and thereby causes the accelerator system to create the second data container for which the incomplete second meta-data was already created by registering the name or namespace in step 306. In step 326, the intermediate result IRi computed in step 314 is stored in the dynamically created second data container AC.TXi. The steps 314-326 may be executed repeatedly until a result was obtained or a termination criterion reached. Each iteration may involve the creation of a respective DDL create statement and the updating of a corresponding incomplete second meta-data by the first DBMS.

According to some embodiments, additional second data containers are created dynamically by the accelerator system for storing one or more intermediate results without communicating dynamically identified information being indicative of the structure of the additional second data containers to the first DBMS. Also, the create table DDL statement for the additional second data containers is solely generated and executed by the accelerator system. This may further increase the performance, because the structural information MD2-TXi_str doesn't have to be communicated to the first DBMS and the catalogue 116 does not have to be updated. However, the first DBMS and the clients 102-105 are not able to access or control the data content of such additional second data containers, because the catalogue 116 lacks corresponding second metadata. Preferentially, the additional second data containers are implemented as temporary data containers which may be deleted automatically, for example upon a session created for performing the computational task assigned to the trigger event 140 expires.

The step 316 of the last iteration may return a result 216. In step 328 the accelerator system performs a callback operation, thereby communicating the structural information MD2-T4_str ("str" for "structure") of the second data container T4 which shall be used to store the result 216 to the first DBMS. The first DBMS in step 330 computes a CREATE statement from the received information MD2-T4_str and executes the DDL statement and supplements in step 332 the incomplete second metadata MD2-T4 incomplete with the received information MD2-T4_str, thereby creating the complete second metadata MD2-T4.

As a consequence of executing the DDL statement, the accelerator system in step 334 creates the second data container AC.T4 and stores the result 216 in the data container. At step 336, result 216 is stored in second container ACT4. As the second metadata MD2-T4 stored in the catalog 116 is complete, the result 216 may be fetched by a client by submitting a SELECT query to the table T4. The single interface 138 having access to the catalog 116 will automatically determine that table T4 is only stored in the accelerator system, not in the first DBMS, and will dispatch the SELECT and any other DML statement directed at table T4 to the accelerator system. For example, any second data container created by the accelerator system whose corresponding second metadata is completed as described may be labeled by a particular container type label, for example "ACCELERATOR ONLY". This label indicates that any DML statement to access the data container needs to be dispatched for execution to the accelerator system.

A "data container" as used herein is a data structure used as a data container for storing data in a structured manner. A data container may be a database table. According to some embodiments, the first and second data containers may be database tables or database views or files managed by a DBMS or an accelerator system or a mixture thereof.

"Metadata" as used herein is data that is descriptive of some features of a data container, but is not descriptive of the data that is stored in the container. For example, metadata may comprise a name such as "employee", "ID", "salary" of a data container or namespace of a data container. The metadata may comprise an indication of the number and names of the columns of a table or view and may comprise constraints of the container or individual columns of the container, for example unique constraints, foreign key constraints, default values for particular columns, a specification of the type or maximal size of data to be stored in a particular column, or the like. A namespace is a prefix, for example "employee_" that is reserved for a set of containers having a name starting with the prefix, for example "employee_1", "employee_2", . . . "employee_35".

A "database" as used herein is an information structure, which comprises one or more data containers, the use of which is controlled by a database management system. The database may be a relational database, an object oriented database, or any other kind of database. Accordingly, the DBMS may be a relational DBMS, an object oriented DBMS, an OLAP DBMS, an OLTP DBMS, or any other kind of DBMS. A DBMS may be optimized for performing a particular kind of database query, for example OLTP queries or OLAP queries quickly.

A "database management system" (DBMS) is a system designed to allow the definition, creation, querying, update, and administration of a database.

An "accelerator system" as used herein is a system designed to allow the querying of data managed by the accelerator system in a particularly fast manner. An accelerator system may be a conventional DBMS coupled to another DBMS or may be a module or plug-in that needs to be operatively coupled to another DBMS in order to be operable to function, for example, to analyze data. The module or plug-in does not provide for a complete DBMS on its own. When coupled to the other DBMS, for example a "first DBMS", the accelerator system is configured to act as an "accelerator", because it is capable of processing at least some kinds of database queries quicker than the other DBMS.

In some embodiments, the accelerator system may be an asymmetric massively parallel processor (AMPP) appliance with a database "façade" on its front end, whereby only the first DBMS may be allowed to access the "façade". Except from the database-like façade that is visible only to the first DBMS, the accelerator system may be organized internally completely different than a conventional DBMS. However, it is also possible that it is organized like a conventional DBMS that hides its SQL interface from outside queries.

A "distributed system" as used herein is a data processing system that may be hosted on one or on multiple different data processing devices which may be connected to each other via a network. The distributed system comprises at least a first DBMS with a catalog, one or more accelerator systems and a single interface for receiving database queries.

A "catalogue" or "database catalogue" as used herein is a component of a database management system that comprises metadata in which definitions of database objects such as base tables, views, synonyms, value ranges, indexes, users, and user groups are stored. According to preferred embodiments, the catalogue is accessible by a uniform SQL standard called the INFORMATION SCHEMA, but there exist also database-specific metadata access methods, for example for Oracle databases.

A "network" as used herein may be any kind of wireless or wired information network. However, the network is such that it can be implemented to work in a telecommunication system, which is compliant with at least one of the following: TCP/IP, Ethernet, ATM, CDMA, GSM, HSCSD, GPRS, WCDMA, EDGE, Bluetooth, UMTS, WLAN and imode.

A "database connection" is a point-to-point data communication channel over data network between a data processing system acting as a client and a system managing a data source. For example, a client system and the first DBMS may be connected by a database connection. According to another example, the first database management system may be connected via one or more database connections to the accelerator system, whereby the first DBMS acts as a client. Once the connection has been established, the client may be enabled for using for example remote procedure calls to process and retrieve some data from the data source.

A "data definition language statement" ("DDL statement") is a database statement defining the structure of data containers of a database, the statement being specified in a formal syntax, for example a syntax used by a DBMS for specifying database schemas. An example for a DDL statement is the CREATE TABLE command ("CREATE TABLE [table name] ([column definitions])[table parameters]").

A "data manipulation language statement" ("DML statement") is a is a database statement which reads stored data from a database or which stores or modifies stored data in a database, but does not modify the schema or structure of the database or the schema or structure of the data containers of the database. An example for a DML statement is the SELECT command, the UPDATE table command, or the INSERT command ("INSERT INTO table (column1 [, column2, column3 . . . ]) VALUES (value1 [, value2, value3 . . . ])").

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for use in connection with a federated database system including a database management system (DBMS) structured and programmed to manage access to database data stored in a constituent database, a catalogue, an accelerator system including a copy of a first portion of the database data and a single interface, the computer-implemented method comprising:
    maintaining, by the first DMBS, first metadata information in the catalogue, with the first metadata information being descriptive of a structure of a first data container type used to store at least some of the database data in the constituent database;
    detecting, by the DBMS, a trigger event for calculating a computational task;
    in response to the detection, creating, by the DBMS, an incomplete version of second metadata information, with the second metadata information being descriptive of a structure of a second data container type, with data containers of the second data container type being absent from the accelerator system, and with the incomplete version of the second metadata including a namespace for the second data container type, and with the incomplete version of the second metadata information lacking at least some structural information descriptive of the second data container type;
    receiving, by the DBMS and from the accelerator system, dynamically-identified information indicative of structural features the second data container type absent from the incomplete version of the second metadata information; and
    responsive to receipt of the dynamically-identified information, supplementing, by the DBMS, the incomplete version of the second metadata information with the dynamically-identified information to create a complete version of the second metadata information descriptive of a namespace and a data structure of the second data container type.

2. The computer-implemented method of claim 1, further comprising:
    dispatching, by the single interface and to the accelerator system, a database statement addressing data containers of the second data container type to the accelerator system using the complete version of the second metadata information.

3. The computer implemented method of claim 2 further comprising:
responsive to the dispatch of the database statement, performing, by the accelerator system the database statement on data filled into a first instance of a second data container structured according to the second data container type.

4. The computer-implemented method of claim 1 further comprising:
configuring the accelerator system to receive and process a database query only on condition that the database query was received by the federated database system via the single interface.

5. The computer-implemented method of claim 1 wherein the maintenance of the catalogue includes updating the catalog a container type label assigned to at least one of the following: the first data container type and/or second data container type.

6. The computer-implemented method of claim 1 wherein the compete version of the second metadata information includes at least: a number of the columns of a data container structured according to the second data container type, a plurality of column names of columns of a data container structured according to the second data container type, data types corresponding to columns of data container structured according to the second data container type, and at least one of the following:
a database constraint for column(s) of a data container structured according to the second data container type, and/or
a database constraint for an entirety of a data container structured according to the second data container type.

7. A computer-implemented method for use in connection with a federated database system including a database management system (DBMS) structured and programmed to manage access to database data stored in a constituent database, a catalogue including first metadata information, with the first metadata information being descriptive of a structure of a first data container type used to store at least some of the database data in the constituent database, an accelerator system including a copy of a first portion of the database data, and a single interface, the computer-implemented method comprising:
receiving, from the DBMS, an incomplete version of second metadata information, with the second metadata information being descriptive of a structure of a second data container type, with data containers of the second data container type being absent from the accelerator system, and with the incomplete version of the second metadata including a namespace for the second data container type, and with the incomplete version of the second metadata information lacking at least some structural information descriptive of the second data container type;
dynamically identifying, by the accelerator system, dynamically-identified information including information indicative of structural features absent from the incomplete version of the second metadata information;
transmitting, by the accelerator system and to the DBMS, the dynamically-identified information;

creating, by the accelerator system, a first instance of a second data container according to the second data container type as specified by the second metadata information;
storing, in the accelerator system, the first instance second data container; and
filling with data the first instance of the second data container.

8. The computer-implemented method of claim 7 further comprising:
sending, from the accelerator system and to the DBMS, the dynamically-identified information.

9. The computer-implemented method of claim 8, further comprising:
receiving, by accelerator system and from the single interface, a dispatched database statement addressing data containers of the second data container type to the accelerator system using the complete version of the second metadata information.

10. The computer implemented method of claim 9 further comprising:
responsive to the receipt of the dispatched database statement, performing, by the accelerator system the database statement on data filled into the first instance of the second data container.

11. The computer-implemented method of claim 8 further comprising:
configuring the accelerator system to receive and process a database query only on condition that the database query was received by the federated database system via the single interface.

12. The computer-implemented method of claim 8, further comprising:
receiving, by the single interface, a database query; and
evaluating, by the single interface, the database query to identify one at least: one, or more, data manipulation statement(s) included in the database query and/or one, or more, data definition statement(s) contained in the received further database query.

13. The computer-implemented method of claim 12, further comprising:
evaluating, by the single interface, the container type label of all first and second containers that will be accessed by any one of the one or more identified data manipulation language statement(s); and
dispatching, by the single interface, each of the identified data manipulation language statement(s) to the accelerator system.

14. The computer-implemented method of claim 13, further comprising:
accessing, by the accelerator system using the data manipulation language statement(s) at least one instance of a data container of the second data container type, with the at least one instance of the data container having assigned the second container type label to thereby avoid accessing any data containers of the first data container type having assigned the first container type label.

15. The computer-implemented method of claim 13, further comprising:
on condition that the data manipulation language statement(s) will access a data containers of the first data container type having assigned the first container type label, providing, by the single interface, each of the identified data manipulation language statement(s) to the DBMS obligatorily for execution in the DBMS to thereby avoid accessing any of the data containers of the second container type having assigned the second container type label.

16. The computer-implemented method of claim 13, further comprising:
   upon both of the following conditions:
      the data manipulation language statement(s) will access a data container of the second data container type having assigned the third container type label, and
      the DBMS predicts that the data manipulation language statement(s) will be executed more quickly in the accelerator system than in the DBMS,
   dispatching, by the single interface, the data manipulation language statement(s) to the accelerator system.

17. The computer-implemented method of claim 8 wherein information absent from the incomplete version of the second metadata information includes at least one of the following:
   the number of the columns of data containers of the second data container type, column names of the columns of data containers of the second data container type, data types of the columns of the second data container type, and/or a database constraint.

18. The computer-implemented version of claim 8 wherein:
   the accelerator system includes a set of stored procedure(s), with the one or more stored procedures being configured for calculating a result for the computational task; and
   the data filling the first instance of the second container is the result of performing the computational task.

19. The computer-implemented method of claim 18, the stored procedure(s) of the set of stored procedure(s) are respectively assigned to one out of a plurality of computational tasks.

20. A federated database system comprising:
   a database management system (DBMS) structured and programmed to manage access to database data stored in a constituent database;
   a catalogue; and
   an accelerator system including a copy of a first portion of the database data and a single interface;
   wherein:
   the first DMBS includes machine logic structured and programmed to:
      maintain first metadata information in the catalogue, with the first metadata information being descriptive of a structure of a first data container type used to store at least some of the database data in the constituent database,
      detect a trigger event for calculating a computational task,
      in response to the detection, create an incomplete version of second metadata information, with the second metadata information being descriptive of a structure of a second data container type, with data containers of the second data container type being absent from the accelerator system, and with the incomplete version of the second metadata including a namespace for the second data container type, and with the incomplete version of the second metadata information lacking at least some structural information descriptive of the second data container type,
      receive from the accelerator system, dynamically-identified information indicative of structural features the second data container type absent from the incomplete version of the second metadata information, and
      responsive to receipt of the dynamically-identified information, supplement the incomplete version of the second metadata information with the dynamically-identified information to create a complete version of the second metadata information descriptive of a namespace and a data structure of the second data container type; and
   the accelerator system is structured and programmed to:
      receive, from the DBMS, an incomplete version of second metadata information, with the second metadata information being descriptive of a structure of a second data container type, with data containers of the second data container type being absent from the accelerator system, and with the incomplete version of the second metadata including a namespace for the second data container type, and with the incomplete version of the second metadata information lacking at least some structural information descriptive of the second data container type,
      dynamically identify dynamically-identified information including information indicative of structural features absent from the incomplete version of the second metadata information,
      transmit, to the DBMS, the dynamically-identified information,
      create a first instance of a second data container according to the second data container type as specified by the second metadata information,
      store, in the accelerator system, the first instance second data container, and
      fill with data the first instance of the second data container.

* * * * *